(12) United States Patent
Zhang et al.

(10) Patent No.: US 12,206,851 B2
(45) Date of Patent: Jan. 21, 2025

(54) IMPLICIT IMAGE AND VIDEO COMPRESSION USING MACHINE LEARNING SYSTEMS

(71) Applicant: QUALCOMM Incorporated, San Diego, CA (US)

(72) Inventors: Yunfan Zhang, Amsterdam (NL); Ties Jehan Van Rozendaal, Amsterdam (NL); Taco Sebastiaan Cohen, Amsterdam (NL); Markus Nagel, Amsterdam (NL); Johann Hinrich Brehmer, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/645,018

(22) Filed: Dec. 17, 2021

(65) Prior Publication Data

US 2022/0385907 A1  Dec. 1, 2022

Related U.S. Application Data

(60) Provisional application No. 63/191,606, filed on May 21, 2021.

(51) Int. Cl.
*H04N 19/126* (2014.01)
*G06N 3/045* (2023.01)
(Continued)

(52) U.S. Cl.
CPC .......... *H04N 19/126* (2014.11); *G06N 3/045* (2023.01); *G06N 3/08* (2013.01); *G06T 9/002* (2013.01); *H04N 19/147* (2014.11); *H04N 19/91* (2014.11)

(58) Field of Classification Search
None
See application file for complete search history.

(56) References Cited

U.S. PATENT DOCUMENTS

2018/0139458 A1  5/2018  Wang et al.
2018/0249158 A1  8/2018  Huang et al.
(Continued)

FOREIGN PATENT DOCUMENTS

| EP | 3451293 A1 | 3/2019 |
|---|---|---|
| WO | 2022017848 A1 | 1/2022 |

OTHER PUBLICATIONS

Video Subgroup: "Working Draft 3 of Compression of Neural Networks for Multimedia Content Description and Analysis", MPEG Meeting, Jan. 13, 2020-Jan. 17, 2020, Brussels (Year: 2020).*

(Continued)

*Primary Examiner* — Samuel D Fereja
(74) *Attorney, Agent, or Firm* — Polsinelli LLP

(57) ABSTRACT

Techniques are described for compressing and decompressing data using machine learning systems. An example process can include receiving a plurality of images for compression by a neural network compression system. The process can include determining, based on a first image from the plurality of images, a first plurality of weight values associated with a first model of the neural network compression system. The process can include generating a first bitstream comprising a compressed version of the first plurality of weight values. The process can include outputting the first bitstream for transmission to a receiver.

44 Claims, 21 Drawing Sheets

(51) Int. Cl.
  *G06N 3/08*   (2023.01)
  *G06T 9/00*   (2006.01)
  *H04N 19/147*   (2014.01)
  *H04N 19/91*   (2014.01)

(56) References Cited

U.S. PATENT DOCUMENTS

| | | | | |
|---|---|---|---|---|
| 2020/0311551 | A1* | 10/2020 | Aytekin | G06N 3/045 |
| 2021/0073525 | A1* | 3/2021 | Weinzaepfel | G06V 10/764 |
| 2022/0004844 | A1* | 1/2022 | Haase | H03M 7/70 |
| 2022/0261616 | A1* | 8/2022 | Li | G06N 3/0454 |
| 2022/0279183 | A1* | 9/2022 | Besenbruch | G06N 3/0472 |
| 2023/0336759 | A1* | 10/2023 | Ikonin | G06N 3/045 |

OTHER PUBLICATIONS

International Search Report and Written Opinion—PCT/US2022/022881—ISA/EPO—Jul. 18, 2022.

Lin D.D., et al., "Fixed Point Quantization of Deep Convolutional Networks", Jan. 7, 2016, pp. 1-10, XP055398862, arxiv:1511.06393v2, pp. 1-15.

Ma S., et al., "Image and Video Compression with Neural Networks: A Review", Arxiv.org, IEEE Transactions on Circuits and Systems for Video Technology, Cornell University Library, 201 OLIN Library Cornell University Ithaca, NY 14853, Apr. 10, 2019, XP081165996, pp. 1-16.

Sun K., et al., "An FPGA-Based Residual Recurrent Neural Network for Real-Time Video Super-Resolution", IEEE Transactions on Circuits and Systems for Video Technology, IEEE, USA, vol. 32, No. 4, May 13, 2021, pp. 1739-1750, XP011905014, ISSN: 1051-8215, DOI: 10.1109/TCSVT.2021.3080241.

Video Subgroup: "Working Draft 3 of Compression of Neural Networks for Multimedia Content Description and Analysis", 129. MPEG Meeting, Jan. 13, 2020-Jan. 17, 2020, Brussels, (Motion Picture Expert Group or ISO/IEC JTC1/SC29/WG11), No. n18992, Feb. 20, 2020, 38 Pages, XP030285327.

* cited by examiner

1300

```
┌─────────────────────────────────────────────────┐
│  RECEIVE A COMPRESSED VERSION OF A FIRST        │
│  PLURALITY OF NEURAL NETWORK WEIGHT VALUES      │
│  ASSOCIATED WITH A FIRST IMAGE FROM A           │
│  PLURALITY OF IMAGES                            │
│                    1302                         │
└─────────────────────────────────────────────────┘
                       │
                       ▼
┌─────────────────────────────────────────────────┐
│  DECOMPRESS THE FIRST PLURALITY OF NEURAL       │
│  NETWORK WEIGHT VALUES                          │
│                    1304                         │
└─────────────────────────────────────────────────┘
                       │
                       ▼
┌─────────────────────────────────────────────────┐
│  PROCESS, USING A FIRST NEURAL NETWORK MODEL,   │
│  THE FIRST PLURALITY OF NEURAL NETWORK WEIGHT   │
│  VALUES TO YIELD THE FIRST IMAGE                │
│                    1306                         │
└─────────────────────────────────────────────────┘
```

RECEIVE INPUT DATA FOR COMPRESSION BY A NEURAL
NETWORK COMPRESSION SYSTEM
1402

SELECT, BASED ON THE INPUT DATA, A MODEL ARCHITECTURE
FOR USE BY THE NEURAL NETWORK COMPRESSION SYSTEM FOR
COMPRESSING THE INPUT DATA
1404

DETERMINE, USING THE INPUT DATA, A PLURALITY OF WEIGHT
VALUES CORRESPONDING TO A PLURALITY OF LAYERS
ASSOCIATED WITH THE MODEL ARCHITECTURE
1406

GENERATE A FIRST BITSTREAM COMPRISING A COMPRESSED
VERSION OF A WEIGHT PRIOR
1408

GENERATE A SECOND BITSTREAM COMPRISING A COMPRESSED
VERSION OF THE PLURALITY OF WEIGHT VALUES UNDER THE
WEIGHT PRIOR
1410

OUTPUT THE FIRST BITSTREAM AND THE SECOND BITSTREAM
FOR TRANSMISSION TO A RECEIVER
1412

FIG. 14

IMPLICIT IMAGE AND VIDEO COMPRESSION USING MACHINE LEARNING SYSTEMS

RELATED APPLICATION

This application claims priority from U.S. Provisional Patent Application No. 63/191,606 that was filed on May 21, 2021, which is incorporated herein by reference.

TECHNICAL FIELD

The present disclosure generally relates to data compression. For example, aspects of the present disclosure include using machine learning systems to compress image and/or video content.

BACKGROUND

Many devices and systems allow media data (e.g., image data, video data, audio data, etc.) to be processed and output for consumption. Media data includes large amounts of data to meet increasing demands in image/video/audio quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some examples, systems and techniques are described for data compression and/or decompression using one or more machine learning systems. In some examples, machine learning systems (e.g., using one or more neural network systems) are provided for compressing and/or decompressing media data (e.g., video data, image data, audio data, etc.). According to at least one illustrative example, a method of processing image data is provided. The method may include: receiving a plurality of images for compression by a neural network compression system; determining, based on a first image from the plurality of images, a first plurality of weight values associated with a first model of the neural network compression system; generating a first bitstream comprising a compressed version of the first plurality of weight values; and outputting the first bitstream for transmission to a receiver.

In another example, an apparatus for processing media data is provided that includes at least one memory and at least one processor (e.g., configured in circuitry) communicatively coupled to the at least one memory. The at least one processor may be configured to: receive a plurality of images for compression by a neural network compression system; determine, based on a first image from the plurality of images, a first plurality of weight values associated with a first model of the neural network compression system; generate a first bitstream comprising a compressed version of the first plurality of weight values; and output the first bitstream for transmission to a receiver.

In another example, a non-transitory computer-readable medium is provided that includes stored thereon at least one instruction that, when executed by one or more processors, may cause the one or more processors to: receive a plurality of images for compression by a neural network compression system; determine, based on a first image from the plurality of images, a first plurality of weight values associated with a first model of the neural network compression system; generate a first bitstream comprising a compressed version of the first plurality of weight values; and output the first bitstream for transmission to a receiver.

In another example, an apparatus for processing image data is provided. The apparatus may include: means for receiving input data for compression by a neural network compression system; means for receiving a plurality of images for compression by a neural network compression system; means for determining, based on a first image from the plurality of images, a first plurality of weight values associated with a first model of the neural network compression system; means for generating a first bitstream comprising a compressed version of the first plurality of weight values; and means for outputting the first bitstream for transmission to a receiver.

In another example, a method for processing media data is provided. The method may include: receiving a compressed version of a first plurality of neural network weight values associated with a first image from a plurality of images; decompressing the first plurality of neural network weight values; and processing, using a first neural network model, the first plurality of neural network weight values to yield the first image.

In another example, an apparatus for processing image data is provided that includes at least one memory and at least one processor (e.g., configured in circuitry) communicatively coupled to the at least one memory. The at least one processor may be configured to: receive a compressed version of a first plurality of neural network weight values associated with a first image from a plurality of images; decompress the first plurality of neural network weight values; and process, using a first neural network model, the first plurality of neural network weight values to yield the first image.

In another example, a non-transitory computer-readable medium is provided that includes stored thereon at least one instruction that, when executed by one or more processors, may cause the one or more processors to: receive a compressed version of a first plurality of neural network weight values associated with a first image from a plurality of images; decompress the first plurality of neural network weight values; and process, using a first neural network model, the first plurality of neural network weight values to yield the first image.

In another example, an apparatus for processing image data is provided. The apparatus may include: means for receiving a compressed version of a first plurality of neural network weight values associated with a first image from a plurality of images; means for decompressing the first plurality of neural network weight values; and means for processing, using a first neural network model, the first plurality of neural network weight values to yield the first image.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 13 is a flowchart illustrating an example of a process for decompressing image data based on implicit neural representations, in accordance with some examples of the present disclosure;

FIG. 14 is a flowchart illustrating an example of a process for compressing image data based on implicit neural representations, in accordance with some examples of the present disclosure;

DETAILED DESCRIPTION

Figure 1:
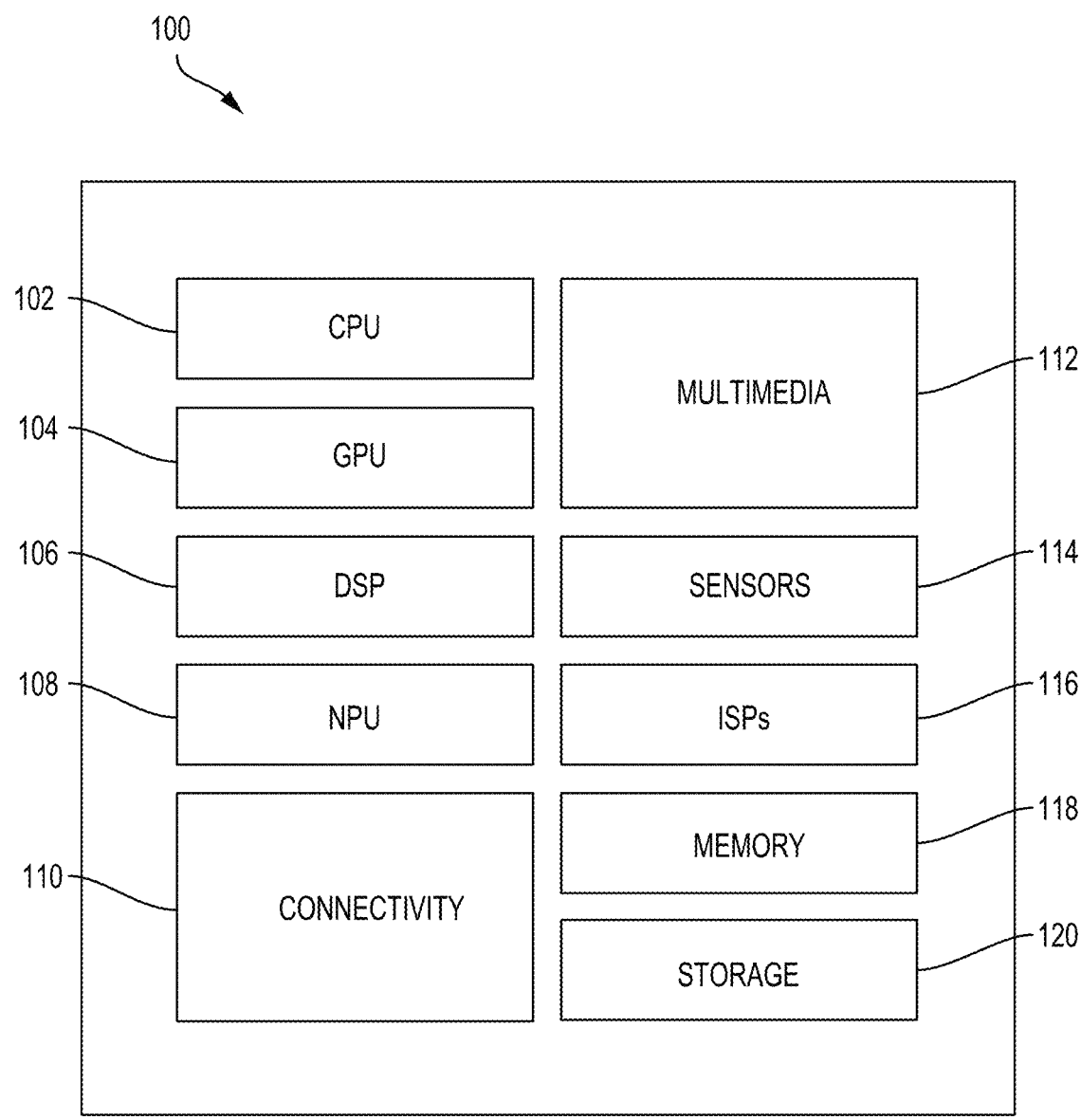
FIG. 1 is a diagram illustrating an example of an image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As noted above, media data (e.g., image data, video data, and/or audio data) can include large amounts of data, particularly as the demand for high quality video data continues to grow. For example, consumers of image, audio, and video data typically desire increasingly high levels of quality, such as high fidelity, resolution, frame rates, and the like. However, the large amount of data needed to meet such demands can place a significant burden on communication networks, such as high bandwidth and network resource requirements, and on devices that process and store the video data. Compression algorithms (also referred to as coding algorithms or tools) for reducing the amount of data that is needed for storage and/or transmission of image and video data are thus advantageous.

Various techniques can be used to compress media data. Compression of image data has been accomplished using algorithms such as Joint Photographic Experts Group (JPEG), Better Portable Graphics (BPG), among others. In recent years, neural network based compression methods have shown significant promise in compressing image data. Video coding can be performed according to a particular video coding standard. Example video coding standards include high-efficiency video coding (HEVC), essential video coding (EVC), advanced video coding (AVC), moving picture experts group (MPEG) coding, and versatile video coding (VVC). However, such conventional image and video coding techniques can result in artifacts in a reconstructed image after decoding is performed.

In some aspects, systems, apparatuses, processes (also referred to as methods), and computer-readable media (collectively referred to herein as "systems and techniques") are described herein for performing data (e.g., image, video, audio, etc.) compression and decompression (also referred to as encoding and decoding, collectively referred to as coding) using one or more machine learning systems. For example, the systems and techniques can be implemented using an implicit neural model. The implicit neural model can be based on implicit neural representations (INR). As described herein, the implicit neural model can take as input coordinate positions (e.g., coordinates within an image or video frame) and can output pixel values (e.g., color values for the image or video frame, such color values for each coordinate position or pixel). In some cases, the implicit neural model can also be based on an IPB-frame scheme. In some examples, the implicit neural model can modify input data to model optical flow.

In some examples, the implicit neural model can model optical flow with implicit neural representations in which local translations can amount to elementwise addition. In some cases, an implicit model can model optical flow by adjusting the input coordinate positions to yield corresponding output pixel values. For instance, elementwise addition of the inputs can lead to local translation at the output, which can eliminate the need and associated computational complexity of pixel movement.

The one or more machine learning systems can be trained as described herein and used to perform data compression and/or decompression, such as image, video, and/or audio compression and decompression. The machine learning systems described herein can be trained to perform compression/decompression techniques that produce high quality data outputs. The systems and techniques described herein can perform compression and/or decompression of any type of data. For example, in some cases, the systems and techniques described herein can perform compression and/or decompression of image data. As another example, in some cases, the systems and techniques described herein can perform compression and/or decompression of video data. As used herein, the term "image" and "frame" are used interchangeably, referring to a standalone image or frame (e.g., a photograph) or a group or sequence of images or frames (e.g., making up a video or other sequence of images/frames). As another example, in some cases, the systems and techniques described herein can perform compression and/or decompression of audio data. For simplicity, illustration and explanation purposes, the systems and techniques described herein are discussed with reference to compression and/or decompression of image data (e.g., images or frames, videos, etc.). However, as noted above, the concepts described herein can also apply to other modalities such as audio data and any other type of data.

A compression model used by an encoder and/or decoder can be generalizable to different types of data. Moreover, by utilizing an implicit neural model with various characteristics described herein, the machine learning system can increase the compression and/or decompression performance, bitrate, quality, and/or efficiency for a particular set of data. For instance, the implicit neural model based machine learning system can eliminate the need to store a pretrained neural network at the receiver side (and at the transmitter side in some cases). The neural network at the transmitter and receiver side can be implemented with a lightweight framework. Another advantage of such a machine learning system is the absence of flow operations by the actual machine learning system (e.g., the neural network), which can be difficult to implement in some cases (e.g., in hardware). In addition, the decoding function can be faster than in standard machine learning based coder-decoders (codecs). In some cases, the implicit neural model based machine learning system described herein does not require a separate training dataset because it can be trained implicitly using the data that is to be encoded (e.g., a coordinate grid and the current instance of an image, video frame, video, etc.). The configuration of the implicit neural model described herein can also lead to the avoidance of potential privacy concerns. The system also performs well on data from different domains, including those for which no suitable training data is available.

In some examples, the machine learning system can include one or more neural networks. Machine learning (ML) is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as deep generative neural network models (e.g., generative adversarial network (GANs)), recurrent neural network (RNN)

models, multilayer perceptron (MLP) neural network models, convolutional neural network (CNN) models, autoencoders (AEs), among others. For example, a GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as G(z)) generates a synthesized output, and the other neural network (referred to as an discriminative neural network or discriminator denoted as D(X)) evaluates the output for authenticity (whether the output is from an original dataset, such as the training dataset, or is generated by the generator). The training input and output can include images as an illustrative example. The generator is trained to try and fool the discriminator into determining a synthesized image generated by the generator is a real image from the dataset. The training process continues and the generator becomes better at generating the synthetic images that look like real images. The discriminator continues to find flaws in the synthesized images, and the generator figures out what the discriminator is looking at to determine the flaws in the images. Once the network is trained, the generator is able to produce realistic looking images that the discriminator is unable to distinguish from the real images.

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

An autoencoder (AE) can learn efficient data codings in an unsupervised manner. In some examples, an AE can learn a representation (e.g., data coding) for a set of data by training the network to ignore signal noise. An AE can include an encoder and a decoder. The encoder can map input data into code and the decoder can map the code to a reconstruction of the input data. In some examples, a rate-distortion autoencoder (RD-AE) can be trained to minimize the average rate-distortion loss over a dataset of datapoints such as image and/or video datapoints. In some cases, the RD-AE can do a forward pass at inference time to encode a new datapoint.

In some examples, a machine learning system for data compression and/or decompression can include a neural network that is trained implicitly (e.g., using the image data that is to be compressed). In some cases, data compression and/or decompression that is based on implicit neural representation (INR) can be implemented using a convolution based architecture. In some aspects, encoding image data can include selecting a neural network architecture and overfitting the network weights on the image data. In some examples, a decoder may include the neural network architecture and receive the network weights from the encoder. In other examples, a decoder may receive the neural network architecture from the encoder.

In some cases, neural network weights can be large, which can increase a bitrate and/or computational overhead needed for sending the weights to a decoder. In some examples, the weights can be quantized to reduce the overall size. In some aspects, the quantized weights can be compressed using a weight prior. The weight prior can reduce the amount of data sent to the decoder. In some cases, the weight prior can be designed to reduce a cost for transmitting the model weights. For example, the weight prior can be used to reduce and/or limit the bitrate overhead of the weights.

In some cases, a design of the weight prior can be improved as further described herein. In some illustrative examples, the weight prior design can include an independent Gaussian weight prior. In other illustrative examples, the weight prior design can include an independent Laplace weight prior. In other illustrative examples, the weight prior design can include an independent Spike and Slab prior. In some illustrative examples, the weight prior can include complex dependencies that are learned by a neural network.

FIG. 1 is a diagram illustrating an example of an image processing system 100 in accordance with some examples of the present disclosure. In some cases, the image processing system 100 can include a central processing unit (CPU) 102 or a multi-core CPU configured to perform one or more of the functions described herein. Variables (e.g., neural signals and synaptic weights), system parameters associated with a computational device (e.g., a neural network with weights), delays, frequency bin information, task information, among other information, may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or distributed across multiple blocks. Instructions executed at the CPU 102 may be loaded from a program memory associated with the CPU 102 and/or a memory block 118.

The image processing system 100 may include additional processing blocks tailored to specific functions, such as a GPU 104; a DSP 106; a connectivity block 110 which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect and recognize features. In one implementation, the NPU 108 is implemented in the CPU 102, DSP 106, and/or GPU 104. The image processing system 100 may also include a sensor processor 114, one or more image signal processors (ISPs) 116, and/or a storage 120. In some examples, the image processing system 100 may be based on an ARM instruction set.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SOC), an Internet-of-Things (IoT) device, or any other suitable electronic device(s).

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 16.

The image processing system 100 and/or components thereof can be configured to perform compression and/or decompression (also referred to as encoding and/or decoding, collectively referred to as image coding) using the machine learning systems and techniques described herein. In some cases, the image processing system 100 and/or components thereof can be configured to perform image or video compression and/or decompression using the techniques described herein. In some examples, the machine learning systems can utilize deep learning neural network architectures to perform compression and/or decompression of image, video, and/or audio data. By using deep learning neural network architectures, the machine learning systems can increase the efficiency and speed of the compression and/or decompression of content on a device. For example, a device using the compression and/or decompression techniques described can compress one or more images efficiently using the machine learning based techniques, can transmit the compressed one or more images to a receiving device, and the receiving device can decompress the one or more compressed images efficiently using the machine learning based techniques described herein. As used herein, an image can refer to a still image and/or a video frame associated with a sequence of frames (e.g., a video).

As noted above, a neural network is an example of a machine learning system. A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
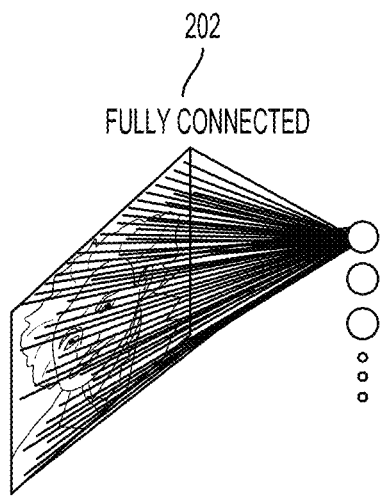
FIG. 2A is a diagram illustrating an example of a fully-connected neural network, in accordance with some examples of the present disclosure.
Figure 2B:
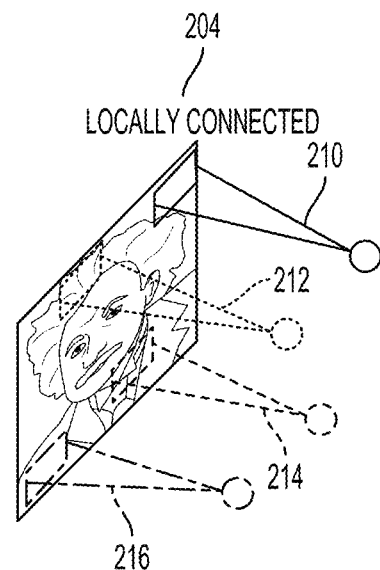
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
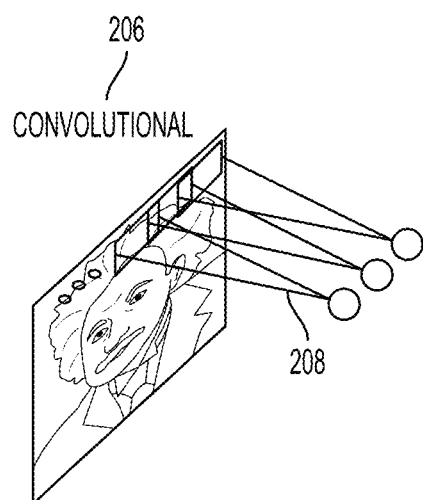
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
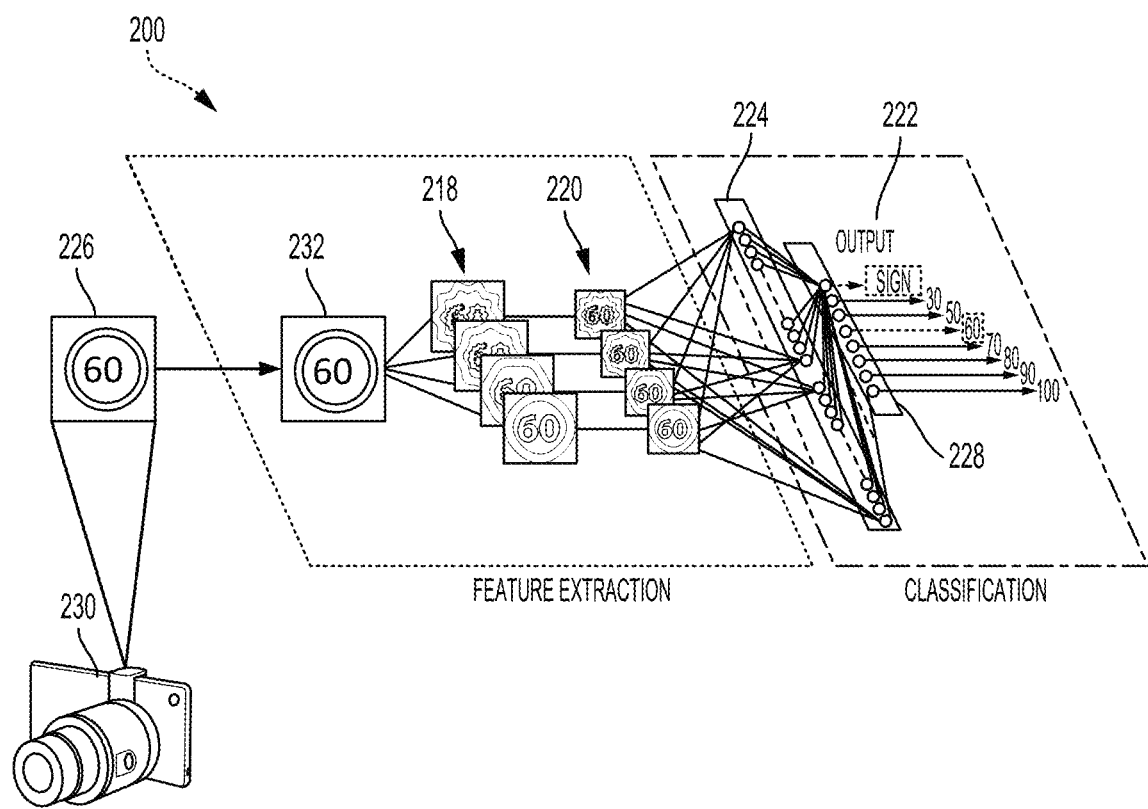
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
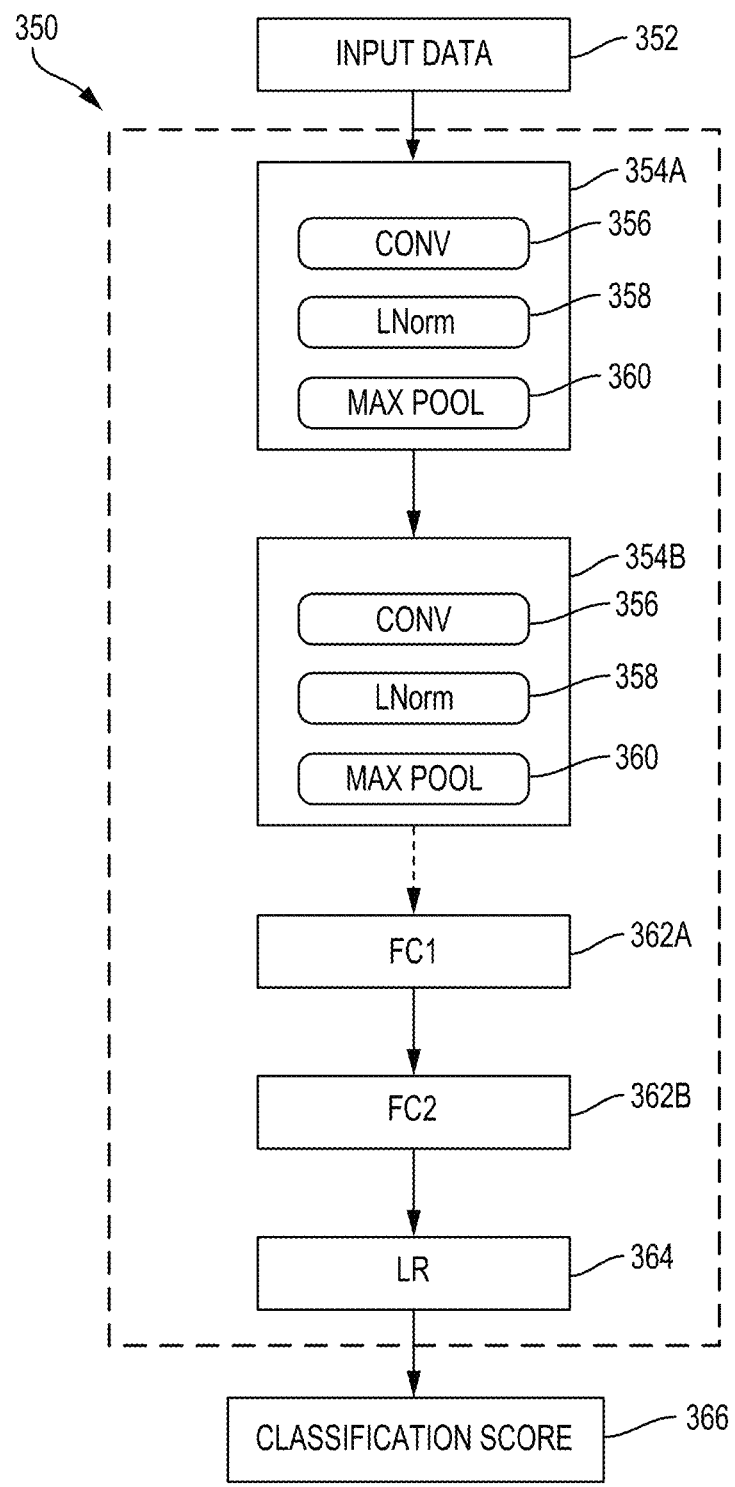
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In alternative embodiments, the parallel filter banks may be loaded on the DSP 106 or an ISP 116 of an image processing system 100. In addition, the deep convolutional network 350 may access other processing blocks that may be present on the image processing system 100, such as sensor processor 114.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Image, audio, and video content may be stored and/or may be shared among devices. For instance, image, audio, and video content can be uploaded to media hosting services and sharing platforms, and can be transmitted to a variety of devices. Recording uncompressed image, audio, and video content generally results in large file sizes that greatly increase as the resolution of the image audio, and video content increases. For example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Because uncompressed image, audio, and video content can result in large files that may involve sizable memory for physical storage and considerable bandwidth for transmission, techniques may be utilized to compress such video content. For instance, to reduce the size of image content—and thus the amount of storage involved to store image content and the amount of bandwidth involved in delivering video content—various compression algorithms may be applied to image, audio, and video content.

In some cases, image content can be compressed using a priori defined compression algorithms, such as Joint Photographic Experts Group (JPEG), Better Portable Graphics (BPG), among others. JPEG, for example, is a lossy form of compression that is based on the discrete cosine transform (DCT). For instance, a device performing JPEG compression of an image can transform the image into an optimal color space (e.g., a YCbCr color space, including luminance (Y), chrominance-blue (Cb), chrominance-red (Cr)), can downsample the chrominance components by averaging groups of pixels together, and can apply a DCT function to blocks of pixels to remove redundant image data and thus compress the image data. The compression is based on identification of similar regions inside of the image and converting the regions to a same color code (based on the DCT function). Video content can also be compressed using a priori defined compression algorithms, such as the Motion Picture Experts Group (MPEG) algorithms, H.264, or the High Efficiency Video Coding algorithm.

These a priori defined compression algorithms may be able to retain the majority of the information in raw image and video content, and may be defined a priori based on signal processing and information theory ideas. However, while these predefined compression algorithms may be applicable generally (e.g., to any type of image/video content), the compression algorithms may not take into account similarities in content, new resolutions or frame rates for video capture and delivery, non-natural imagery (e.g., radar imagery or other imagery captured via various sensors), and the like.

The a priori defined compression algorithms are considered lossy compression algorithms. In lossy compression of an input image (or video frame), the input image cannot be coded and then decoded/reconstructed so that the exact input image is reconstructed. Rather, in lossy compression, an approximate version of the input image is generated after decoding/reconstruction of the compressed input image. Lossy compression results in a reduction in bitrate, at the cost of distortion which results in artifacts being present in the reconstructed image. Therefore, there is a rate-distortion trade-off in lossy compression systems. For certain compression methods (e.g., JPEG, BPG, among others), the distortion-based artifacts can take the form of blocking or other artifacts. In some cases, neural network based compression can be used and can result in high quality compression of image data and video data. In some cases, blurring and color shift are examples of artifacts.

Whenever the bitrate goes below a true entropy of input data, it may be difficult or impossible to reconstruct the exact input data. However, the fact that there is distortion/loss realized from the compression/decompression of the data does not mean that the reconstructed image or frame does not have to have artifacts. Indeed, it can be possible to reconstruct a compressed image to another similar, but different, image that has high visual quality.

In some cases, compression and decompression can be performed using one or more machine learning (ML) systems. In some examples, such ML based systems can provide image and/or video compression that produces high quality visual outputs. In some examples, such systems can perform compression and decompression of content (e.g., image content, video content, audio content, etc.) using a deep neural network(s) such as a rate-distortion autoencoder (RD-AE). The deep neural network can include an autoencoder (AE) that maps images into a latent code space (e.g., including a set of codes z). The latent code space can include a code space used by an encoder and a decoder, and in which the content has been encoded into the codes z. The codes (e.g., codes z) can also be referred to as latents, latent variables or latent representations. The deep neural network can include a probabilistic model (also referred to as a prior or code model) that can losslessly compress the codes z from the latent code space. The probabilistic model can generate a probability distribution over the set of codes z that can represent encoded data based on the input data. In some cases, the probability distribution can be denoted as (P(z)).

In some examples, the deep neural network may include an arithmetic coder that generates a bitstream including the compressed data to be output based on the probability distribution P(z) and/or the set of codes z. The bitstream including the compressed data can be stored and/or can be transmitted to a receiving device. The receiving device can perform an inverse process to decode or decompress the bitstream using, for example, an arithmetic decoder, a probabilistic (or code) model, and a decoder of an AE. The device that generated the bitstream including the compressed data can also perform a similar decoding/decompression process when retrieving the compressed data from storage. A similar technique can be performed to compress/encode and decompress/decode updated model parameters.

In some examples, an RD-AE can be trained and operated to perform as a multi-rate AE (including high-rate and low-rate operations). For example, the latent code space generated by an encoder of the multi-rate AE can be divided into two or more chunks (e.g., codes z divided into chunks $z_1$ and $z_2$). In a high-rate operation, the multi-rate AE can send a bitstream that is based on the entire latent space (e.g., codes z, including $z_1$, $z_2$, etc.) which can be used by the receiving device to decompress the data, similar to the operations described above with respect to the RD-AE. In the low-rate operation, the bitstream that is sent to the receiving device is based on a subset of the latent space (e.g., the chunk $z_1$ and not $z_2$). The receiving device can infer the remaining portion of the latent space based on the subset that was sent, and can generate a reconstructed data using the subset of the latent space and the inferred remaining portion of the latent space.

By compressing (and decompressing) content using the RD-AE or the multi-rate AE, encoding and decoding mechanisms can be adaptable to various use cases. The machine learning based compression techniques can generate compressed content having a high quality and/or reduced bitrate. In some examples, an RD-AE can be trained to minimize the average rate-distortion loss over a dataset of datapoints, such as image and/or video datapoints. In some cases, the RD-AE can also be fine-tuned for a particular datapoint to be sent to and decoded by a receiver. In some examples, by fine-tuning the RD-AE on a datapoint, the RD-AE can obtain a high compression (Rate/Distortion) performance. An encoder associated with the RD-AE can send the AE model or part of the AE model to a receiver (e.g., a decoder) to decode the bitstream.

In some cases, a neural network compression system can reconstruct an input instance (e.g., an input image, video, audio, etc.) from a (quantized) latent representation. The neural network compression system can also use a prior to losslessly compress the latent representation. In some cases, the neural network compression system can determine a test-time data distribution is known and relatively low entropy (e.g. a camera watching a static scene, a dash cam in an autonomous car, etc.), and can be fine-tuned or adapted to such distribution. The fine-tuning or adaptation can lead to improved rate/distortion (RD) performance. In some examples, a model of the neural network compression system can be adapted to a single input instance to be compressed. The neural network compression system can provide model updates, which in some examples can be quantized and compressed using a parameter-space prior, along with the latent representation.

The fine-tuning can take into account the effect of model quantization and the additional costs incurred by sending model updates. In some examples, the neural network compression system can be fine-tuned using an RD loss as well as an additional model rate term M that measures the number of bits needed to send model updates under a model prior, resulting in a combined RDM loss.

Figure 4:
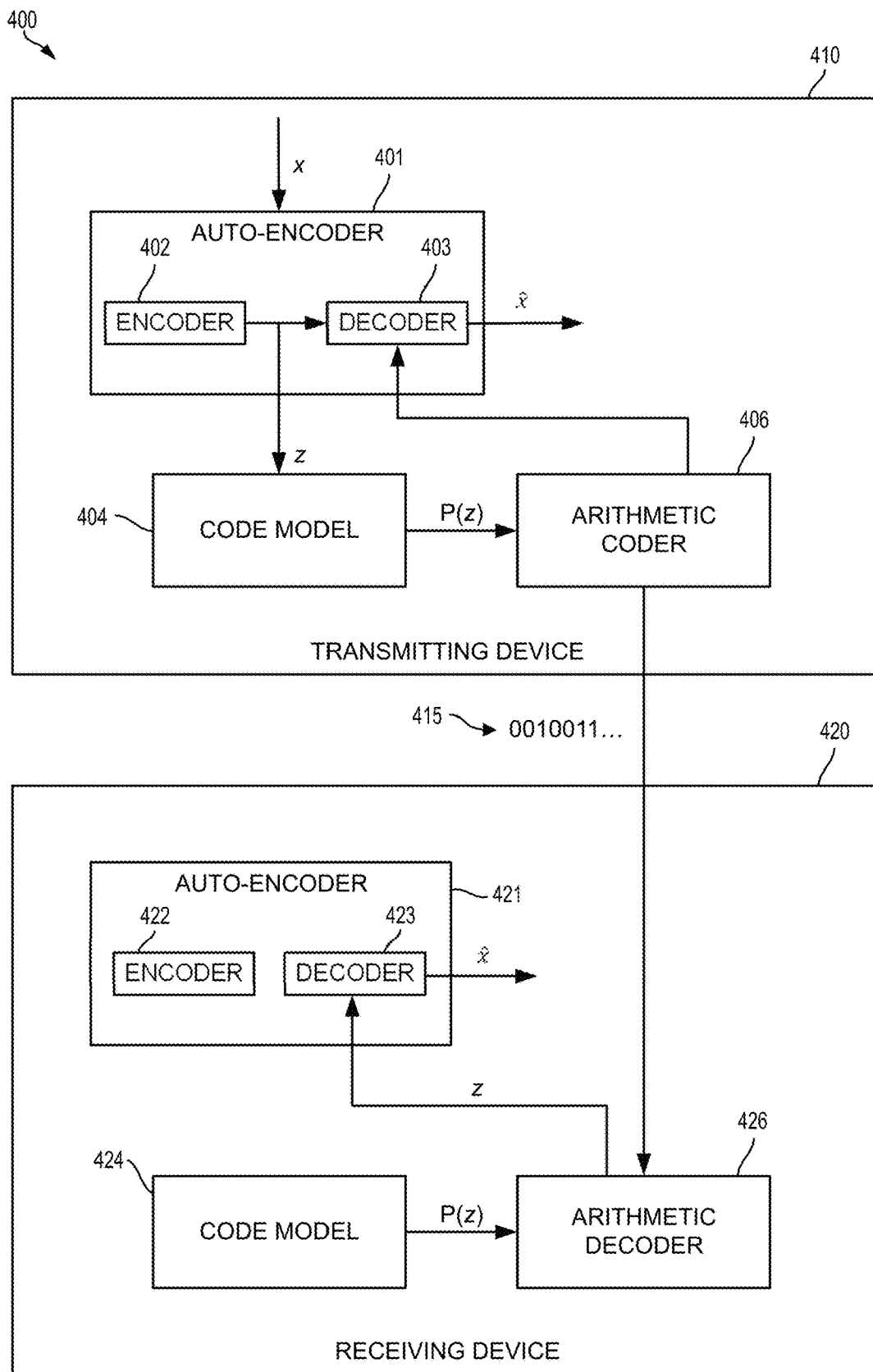
FIG. 4 is a diagram illustrating an example of a system including a transmitting device for compressing video content and a receiving device for decompressing a received bitstream into video content, in accordance with some examples of the present disclosure.

FIG. 4 is a diagram illustrating a system 400 including a transmitting device 410 and a receiving device 420, in accordance with some examples of the present disclosure. The transmitting device 410 and the receiving device 420 can each be referred to in some cases as a RD-AE. The transmitting device 410 can compress image content, and can store the compressed image content and/or transmit the compressed image content to a receiving device 420 for decompression. The receiving device 420 can decompress the compressed image content, and can output the decompressed image content on the receiving device 420 (e.g., for display, editing, etc.) and/or can output the decompressed image content to other devices (e.g., a television, a mobile device, or other device) connected to receiving device 420. In some cases, the receiving device 420 can become a transmitting device by compressing (using encoder 422) image content and storing and/or transmitting the compressed image content to another device, such as the transmitting device 410 (in which case the transmitting device 410 would become a receiving device). While the system 400 is described herein with respect to image compression and decompression, one of skill will appreciate that the system 400 can use the techniques described herein for compressing and decompressing video content.

As illustrated in FIG. 4, the transmitting device 410 includes an image compression pipeline, and the receiving device 420 includes an image bitstream decompression pipeline. The image compression pipeline in the transmitting device 410 and the bitstream decompression pipeline in the receiving device 420 generally use one or more artificial neural networks to compress image content and/or decompress a received bitstream into image content, according to aspects of the present disclosure. The image compression pipeline in the transmitting device 410 includes an autoencoder 401, a code model 404, and an arithmetic coder 406. In some implementations, the arithmetic coder 406 is optional and can be omitted in some cases. The image decompression pipeline in the receiving device 420 includes an autoencoder 421, a code model 424, and an arithmetic decoder 426. In some implementations, the arithmetic decoder 426 is optional and can be omitted in some cases. The autoencoder 401 and the code model 404 of the transmitting device 410 are illustrated in FIG. 4 as a machine learning system that has been previously trained and thus configured for performing operations during inference or operation of the trained machine learning system. The autoencoder 421 and the code model 424 are also illustrated as a machine learning system that has been previously trained.

The autoencoder 401 includes an encoder 402 and a decoder 403. The encoder 402 can perform lossy compression on received uncompressed image content by mapping pixels in one or more images of the uncompressed image content to a latent code space (including codes z). Generally, encoder 402 may be configured such that the codes z representing a compressed (or encoded) image are discrete or binary. These codes may be generated based on stochastic perturbation techniques, soft vector quantization, or other techniques that can generate distinct codes. In some aspects, autoencoder 401 may map uncompressed images to codes having a compressible (low entropy) distribution. These codes may be close in cross-entropy to a predefined or learned prior distribution.

In some examples, the autoencoder 401 can be implemented using a convolutional architecture. For instance, in some cases, autoencoder 401 can be configured as a two-dimensional convolutional neural network (CNN) such that autoencoder 401 learns spatial filters for mapping image content to the latent code space. In examples in which the system 400 is used for coding video data, the autoencoder 401 can be configured as a three-dimensional CNN such that autoencoder 401 learns spatio-temporal filters for mapping video to a latent code space. In such a network, the autoencoder 401 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, autoencoder 401 may be implemented as a two-dimensional neural network conditioned on previous frames, a residual factor between frames, and conditioning through stacking channels or including recurrent layers.

The encoder 402 of the autoencoder 401 can receive as input a first image (designated in FIG. 4 as image x) and can map the first image x to a code z in a latent code space. As noted above, the encoder 402 can be implemented as a two-dimensional convolutional network such that the latent code space has at each (x, y) position a vector describing a block of the image x centered at that position. The x-coordinate can represent a horizontal pixel location in the block of the image x, and the y-coordinate can represent a vertical pixel location in the block of the image x. When coding video data, the latent code space can have a t variable or position, with the t variable representing a timestamp in a block of video data (in addition to the spatial x- and y-coordinates). By using the two dimensions of the horizontal and vertical pixel positions, the vector can describe an image patch in the image x.

A decoder 403 of the autoencoder 401 can then decompress the code z to obtain a reconstruction x̂ of the first image x. Generally, the reconstruction x̂ can be an approximation of the uncompressed first image x and need not be an exact copy of the first image x. In some cases, the reconstructed image z can be output as a compressed image file for storage in the transmitting device.

The code model 404 receives the code z representing an encoded image or portion thereof and generates a probability distribution P(z) over a set of compressed codewords that can be used to represent the code z. In some examples, the code model 404 can include a probabilistic auto-regressive generative model. In some cases, the codes for which a probability distribution may be generated include a learned distribution that controls bit assignment based on the arithmetic coder 406. For example, using the arithmetic coder 406, a compression code for a first code z can be predicted in isolation; a compression code for a second code z can be predicted based on the compression code for the first code z; a compression code for a third code z can be predicted based on the compression codes for the first code z and the second code z, and so on. The compression codes generally represent different spatio-temporal chunks of a given image to be compressed.

In some aspects, z may be represented as a three-dimensional tensor. The three dimensions of the tensor may include a feature channel dimension, and height and width spatial dimensions (e.g., denoted as code $z_{c,w,h}$). Each code $z_{c,w,h}$ (representing a code indexed by channel and horizontal and vertical position) can be predicted based on a previous code, which can be a fixed and theoretically arbitrary ordering of codes. In some examples, the codes can be generated by analyzing a given image file from start to finish and analyzing each block in the image in a raster scan order.

The code model 404 can learn the probability distribution for an input code z using a probabilistic auto-regressive model. The probability distribution can be conditioned on its previous values (as described above). In some examples, the probability distribution can be represented by the following equation:

$$P(z)=\Pi_{c=0}^{C}\Pi_{w=0}^{W}\Pi_{h=0}^{H}p(z_{c,w,h}|z_{0:c,0:w,0:h})$$

where c is a channel index for all image channels C (e.g., the R, G, and B channels, the Y, Cb, and Cr channels, or other channels), w is a width index for a total image frame width W, and h is a height index for a total image frame height H.

In some examples, the probability distribution P(z) can be predicted by a fully convolutional neural network of causal convolutions. In some aspects, the kernels of each layer of the convolutional neural network can be masked such that the convolutional network is aware of previous values $z_{0:c,0:w,0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input).

The arithmetic coder 406 uses the probability distribution P(z) generated by the code model 404 to generate a bitstream 415 (shown in FIG. 4 as "0010011 . . . ") corresponding to a prediction of the code z. The prediction of the code z can be represented as the code having a highest probability score in a probability distribution P(z) generated over a set of possible codes. In some aspects, the arithmetic coder 406 can output a bitstream of variable length based on the accuracy of a prediction of code z and the actual code z generated by the autoencoder 401. For example, the bitstream 415 can correspond to a short codeword if the prediction is accurate, whereas the bitstream 415 may correspond to longer codewords as a magnitude of a difference between code z and the prediction of code z increases.

In some cases, the bitstream 415 can be output by arithmetic coder 406 for storage in a compressed image file. The bitstream 415 can also be output for transmission to a requesting device (e.g., the receiving device 420, as illustrated in FIG. 4). Generally, the bitstream 415 output by the arithmetic coder 406 may losslessly encode z such that z may be accurately recovered during a decompression processes applied on a compressed image file.

The bitstream 415 generated by the arithmetic coder 406 and transmitted from the transmitting device 410 can be received by the receiving device 420. Transmission between the transmitting device 410 and the receiving device 420 can occur using any of various suitable wired or wireless communication technologies. Communication between the transmitting device 410 and the receiving device 420 may be direct or may be performed through one or more network infrastructure components (e.g., base stations, relay stations, mobile stations, network hubs, routers, and/or other network infrastructure components).

As illustrated, the receiving device 420 can include an arithmetic decoder 426, a code model 424, and an autoencoder 421. The autoencoder 421 includes an encoder 422 and a decoder 423. The decoder 423, for a given input, can produce the same or a similar output as the decoder 403. While the autoencoder 421 is illustrated as including the encoder 422, the encoder 422 need not be used during the decoding process to obtain (e.g., an approximation of an original image x that was compressed at the transmitting device 410) from a code z received from the transmitting device 410.

The received bitstream 415 can be input into the arithmetic decoder 426 to obtain one or more codes z from the bitstream. The arithmetic decoder 426 may extract a decompressed code z based on a probability distribution P(z) generated by the code model 424 over a set of possible codes and information associating each generated code z with a bitstream. Given a received portion of the bitstream and a probabilistic prediction of the next code z, the arithmetic decoder 426 can produce a new code z as it was encoded by arithmetic coder 406 at transmitting device 410. Using the new code z, the arithmetic decoder 426 can make a probabilistic prediction for a successive code z, read an additional part of the bitstream, and decode the successive code z until the entire received bitstream is decoded. The decompressed code z may be provided to the decoder 423 in the autoencoder 421. The decoder 423 decompresses the code z and outputs an approximation x̂ (which can be referred to as a reconstructed or decoded image) of the image content x. In some cases, the approximation z of the content x can be stored for later retrieval. In some cases, the approximation z of the content x may be recovered by the receiving device 420 and displayed on a screen communicatively coupled to or integral with the receiving device 420.

As noted above, the autoencoder 401 and the code model 404 of the transmitting device 410 are illustrated in FIG. 4 as a machine learning system that has been previously trained. In some aspects, autoencoder 401 and the code model 404 can be trained together using image data. For instance, the encoder 402 of the autoencoder 401 can receive as input a first training image n and can map the first training image n to a code z in the latent code space. The code model 404 can learn a probability distribution P(z) for the code z using the probabilistic auto-regressive model (similar to the techniques described above). The arithmetic coder 406 can use the probability distribution P(z) generated by the code model 404 to generate an image bitstream. Using the bitstream and the probability distribution P(z) from the code model 404, the arithmetic coder 406 can generate the code z, and can output the code z to the decoder 403 of the autoencoder 401. The decoder 403 can then decompress the code z to obtain a reconstruction n̂ of the first training image n (where the reconstruction n̂ is an approximation of the uncompressed first training image n).

In some cases, a backpropagation engine used during training of the transmitting device 410 can perform a backpropagation process to tune parameters (e.g., weights, biases, etc.) of the neural network of the autoencoder 401 and the code model 404 based on one or more loss functions. In some cases, the backpropagation process can be based on stochastic gradient descent techniques. Backpropagation can include a forward pass, one or more loss functions, a backward pass, and a weight (and/or other parameter(s)) update. The forward pass, loss function, backward pass, and parameter update can be performed for one training iteration. The process can be repeated for a certain number of iterations for each set of training data until the weights and/or other parameters of the neural network are accurately tuned.

For example, the autoencoder 401 can compare n and n̂ to determine a loss (e.g., represented by a distance vector or other difference value) between the first training image n and the reconstructed first training image n. The loss function can be used to analyze error in the output. In some examples, the loss can be based on a maximum likelihood. In one illustrative example using an uncompressed image n as input and reconstructed image n̂ as the output, the loss function Loss=D+beta*R can be used to train the neural network system of the autoencoder 401 and code model 404, where R is rate, D is distortion, * denotes a multiplication function, and beta is a tradeoff parameter that is set to a value that defines the bitrate. In another example, the loss function Loss0=$\Sigma_t$ distortion(n,n̂) can be used to train the neural network system of the autoencoder 401 and code model 404. Other loss functions can be used in some cases, such as when other training data is used. One example of another loss function includes a mean squared error (MSE), defined as $$E_{total} = \sum \frac{1}{2}(\text{target} - \text{output})^2.$$

The MSE calculates the sum of one-half times the actual answer minus the predicted (output) answer squared.

Based on the determined loss (e.g., the distance vector or other difference value) and using the backpropagation process, the parameters (e.g., weights, biases, etc.) of the neural network system of the autoencoder 401 and the code model 404 can be adjusted (effectively adjusting mappings between received image content and the latent code space) to reduce the loss between input uncompressed images and compressed image content generated as output by the autoencoder 401.

The loss (or error) may be high for the first training images, since the actual output values (a reconstructed image) may be much different than the input image. A goal of training is to minimize the amount of loss for the predicted output. The neural network can perform a backward pass by determining which nodes of the neural network (with corresponding weights) most contributed to the loss of the neural network, and can adjust the weights (and/or other parameters) so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network system of the autoencoder 401 and the code model 404 can continue to be trained in such a manner until a desired output is achieved. For example, the autoencoder 401 and code model 404 can repeat the backpropagation process to minimize or otherwise reduce differences between an input image n and a reconstructed image ñ resulting from decompression of a generated code z.

The autoencoder 421 and the code model 424 can be trained using similar techniques as that described above for training the autoencoder 401 and the code model 404 of the transmitting device 410. In some cases, the autoencoder 421 and the code model 424 can be trained using a same or a different training dataset used to train the autoencoder 401 and the code model 404 of the transmitting device 410.

In the example shown in FIG. 4, the rate-distortion autoencoders (the transmitting device 410 and the receiving device 420) are trained and run at inference according to a bitrate. In some implementations, a rate-distortion autoencoder can be trained at multiple bitrates to allow for generation and output of high quality reconstructed images or video frames (e.g., without or with limited artifacts due to distortion with respect to the input image) when varying amounts of information are provided in the latent codes z.

In some implementations, the latent codes z can be divided into at least two chunks $z_1$ and $z_2$. When the RD-AE model is used at a high-rate setting, both chunks are transmitted to a device for decoding. When the rate-distortion autoencoder model is used in a low-rate setting, only chunk $z_1$ is transmitted and chunk $z_2$ is inferred from $z_1$ on the decoder side. The inference of $z_2$ from $z_1$ can be performed using various techniques, as described in more detail below.

In some implementations, a set of continuous latents (e.g., which can convey a large amount of information) and corresponding quantized discrete latents (e.g., which contain less information) can be used. After training the RD-AE model, an auxiliary dequantization model can be trained. In some cases, when using the RD-AE, only the discrete latents are transmitted, and the auxiliary dequantization model is used on the decoder side to infer the continuous latents from the discrete latents.

While the system 400 is shown to include certain components, one of ordinary skill will appreciate that the system 400 can include more or fewer components than those shown in FIG. 4. For example, the transmitting device 410 and/or the receiving device 420 of the system 400 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 4. The components shown in FIG. 4, and/or other components of the system 400, can be implemented using one or more compute or processing components. The one or more compute components can include a central processing unit (CPU), a graphics processing unit (GPU), a digital signal processor (DSP), and/or an image signal processor (ISP). An illustrative example of a computing device and hardware components that can be implemented with the system 1600 is described below with respect to FIG. 16.

The system 400 can be part of, or implemented by, a single computing device or multiple computing devices. In some examples, the transmitting device 410 can be part of a first device and the receiving device 420 can be part of a second computing device. In some examples, the transmitting device 410 and/or the receiving device 420 can be included as part of an electronic device (or devices) such as a telephone system (e.g., a smartphone, a cellular telephone, a conferencing system, etc.), a desktop computer, a laptop or notebook computer, a tablet computer, a set-top box, a smart television, a display device, a gaming console, a video streaming device, a SOC, an IoT (Internet-of-Things) device, a smart wearable device (e.g., a head-mounted display (HMD), smart glasses, etc.), a camera system (e.g., a digital camera, an IP camera, a video camera, a security camera, etc.), or any other suitable electronic device(s). In some cases, the system 400 can be implemented by the image processing system 100 shown in FIG. 1. In other cases, the system 400 can be implemented by one or more other systems or devices.

Figure 5A:
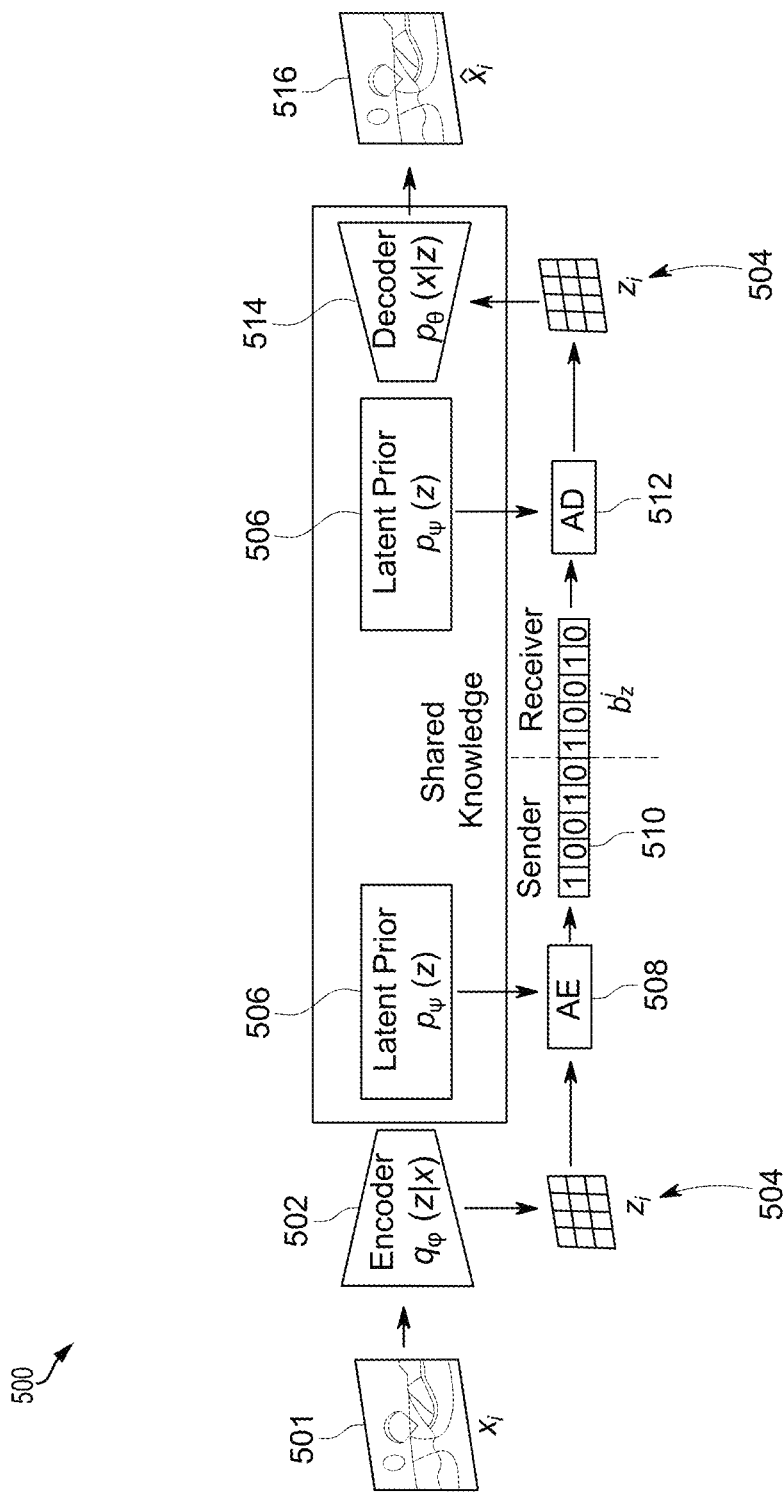
FIG. 5A and FIG. 5B are diagrams illustrating example rate-distortion autoencoder systems, in accordance with some examples of the present disclosure.

FIG. 5A is a diagram illustrating an example neural network compression system 500. In some examples, the neural network compression system 500 can include an RD-AE system. In FIG. 5A, the neural network compression system 500 includes an encoder 502, an arithmetic encoder 508, an arithmetic decoder 512, and a decoder 514. In some cases, the encoder 502 and/or decoder 514 can be the same as encoder 402 and/or decoder 403, respectively. In other cases, the encoder 502 and/or decoder 514 can be different than encoder 402 and/or decoder 403, respectively.

The encoder 502 can receive an image 501 (image $x_i$) as input and can map and/or convert the image 501 (image $x_i$) to a latent code 504 (latent $z_i$) in a latent code space. The image 501 can represent a still image and/or a video frame associated with a sequence of frames (e.g., a video). In some cases, the encoder 502 can perform a forward pass to generate the latent code 504. In some examples, the encoder 502 can implement a learnable function. In some cases, the encoder 502 can implement a learnable function parameterized by φ. For example, the encoder 502 can implement function $q_\varphi(z|x)$. In some examples, the learnable function does not need to be shared with, or known by, the decoder 514.

The arithmetic encoder 508 can generate a bitstream 510 based on the latent code 504 (latent $z_i$) and a latent prior 506. In some examples, the latent prior 506 can implement a learnable function. In some cases, the latent prior 506 can implement a learnable function parameterized by ψ. For example, the latent prior 506 can implement function $p_\psi(z)$. The latent prior 506 can be used to convert latent code 504 (latent $z_i$) into bitstream 510 using lossless compression. The latent prior 506 can be shared and/or made available at both the sender side (e.g., the encoder 502 and/or the arithmetic encoder 508) and the receiver side (e.g., the arithmetic decoder 512 and/or the decoder 514).

The arithmetic decoder 512 can receive encoded bitstream 510 from the arithmetic encoder 508 and use the latent prior 506 to decode latent code 504 (latent $z_i$) in the encoded bitstream 510. The decoder 514 can decode latent code 504 (latent $z_i$) into approximate reconstruction image 516 (reconstruction $\hat{x}_i$). In some cases, the decoder 514 can implement a learnable function parameterized by θ. For example, the decoder 514 can implement function $p_\theta(x|z)$. The learnable function implemented by the decoder 514 can be shared and/or made available at both the sender side (e.g., the encoder 502 and/or the arithmetic encoder 508) and the receiver side (e.g., the arithmetic decoder 512 and/or the decoder 514).

The neural network compression system 500 can be trained to minimize the rate-distortion. In some examples, the rate reflects the length of the bitstream 510 (bitstream b), and the distortion reflects the distortion between the image 501 (image $x_i$) and the reconstruction image 516 (reconstruction $\hat{x}_i$). A parameter β can be used to train a model for a specific rate-distortion ratio. In some examples, the parameter β can be used to define and/or implement a certain tradeoff between rate and distortion.

In some examples, a loss can be denoted as follows: $L_{RD}(x; \varphi, \psi, \theta) = E_{q_{\varphi(x|x)}}[-\log p_\theta(x|z) - \beta \log p_\psi(z)]$, where the function E is an expectation. The distortion (x|z; θ) can be determined based on a loss function such as, for example, a mean squared error (MSE). In some examples, the terms $-\log p_\theta(x|z)$ can indicate and/or represent the distortion D(x|z; θ).

The rate for sending latents can be denoted as $R_z(z; \psi)$. In some examples, the terms $\log p_\psi(z)$ can indicate and/or represent the rate $R_z(z; \psi)$. In some cases, the loss can be minimized over the full dataset D as follows: $\varphi_D^*, \psi_P^*, \theta_D^* = \text{argmin } E_{x \sim D}[L_{RD}(x; \varphi, \psi, \theta)]$.

Figure 5B:
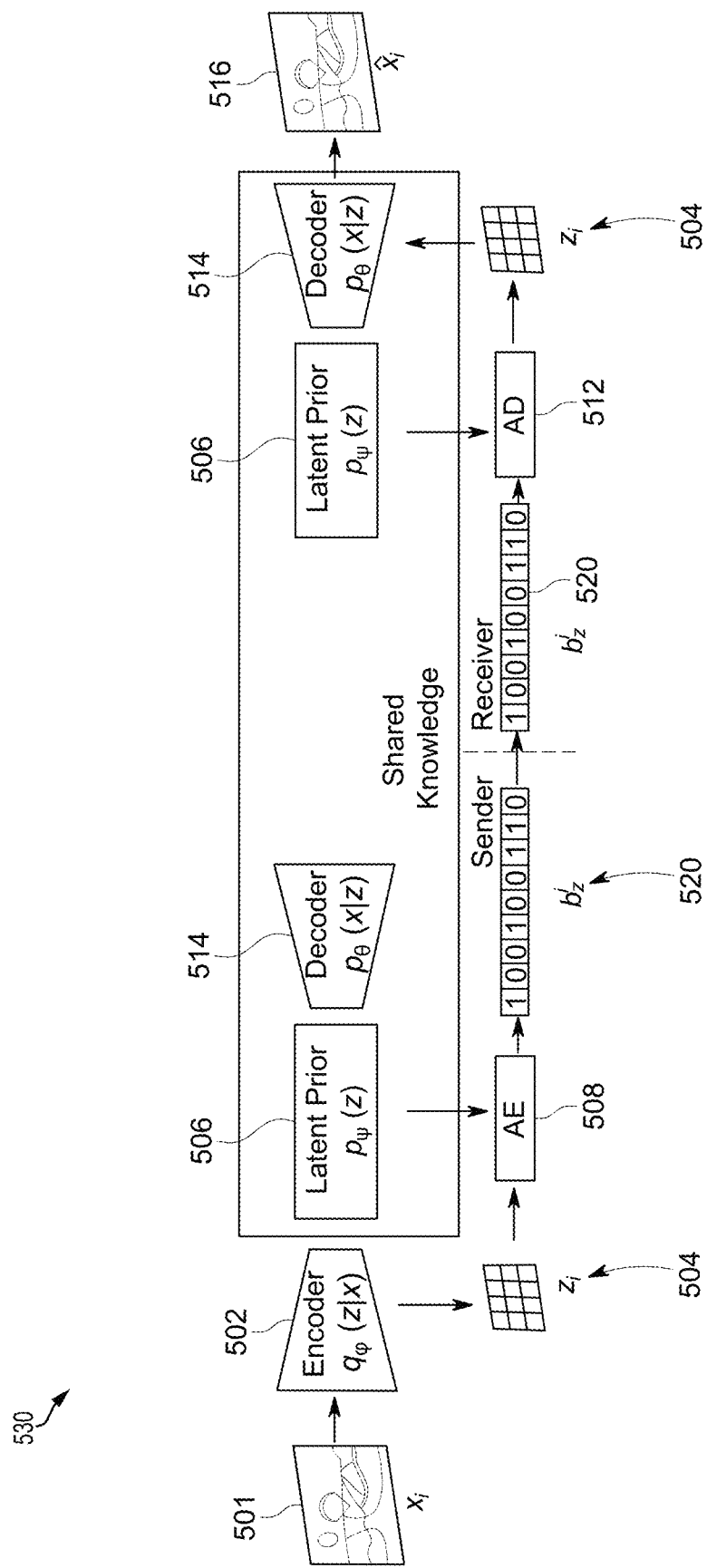

FIG. 5B is a diagram illustrating an example neural network compression system 530 for implementing an inference process. As shown, the encoder 502 can convert image 501 to latent code 504. In some examples, the image 501 can represent a still image and/or a video frame associated with a sequence of frames (e.g., a video).

In some examples, the encoder 502 can encode image 501 using a single forward pass $z = q_{\varphi_D^*}(z|x)$. The arithmetic encoder 508 can then perform arithmetic coding of latent code 504 (latent $z_i$) under the latent prior 506 to generate bitstream 520 ($b_z^i$). In some examples, the arithmetic encoder 508 can generate the bitstream 520 as follows: $b_z^i = AE(z|p_{\psi_D^*}(z))$.

The arithmetic decoder 512 can receive the bitstream 520 from the arithmetic encoder 508 and perform arithmetic decoding of latent code 504 (latent $z_i$) under the latent prior 506. In some examples, the arithmetic decoder 512 can decode the latent code 504 from the bitstream 520 as follows: $z = AD(b_z^i|p_{\psi_D^*}(z))$. The decoder 514 can decode latent code 504 (latent $z_i$) and generate reconstruction image 516 (reconstruction $\hat{x}_i$). In some examples, the decoder 514 can decode latent code 504 (latent $z_i$) using a single forward pass as follows: $\hat{x} = p_{\theta_D^*}(x|z)$.

In some examples, an RD-AE system can be trained using a set of training data and further fine-tuned for the datapoint (e.g., image data, video data, audio data) to be transmitted to and decoded by a receiver (e.g., a decoder). For example, at inference time, the RD-AE system can be fine-tuned on the image data being transmitted to the receiver. Since compression models are generally large, sending the parameters associated with the model to the receiver can be very costly in terms of resources such as network (e.g., bandwidth, etc.), storage and compute resources. In some cases, the RD-AE system can be fine-tuned on a single datapoint being compressed and sent to a receiver for decompression. This can limit the amount of information (and associated cost) that is sent to the receiver, while maintaining and/or increasing a compression/decompression efficiency, performance, and/or quality.

Figure 6:
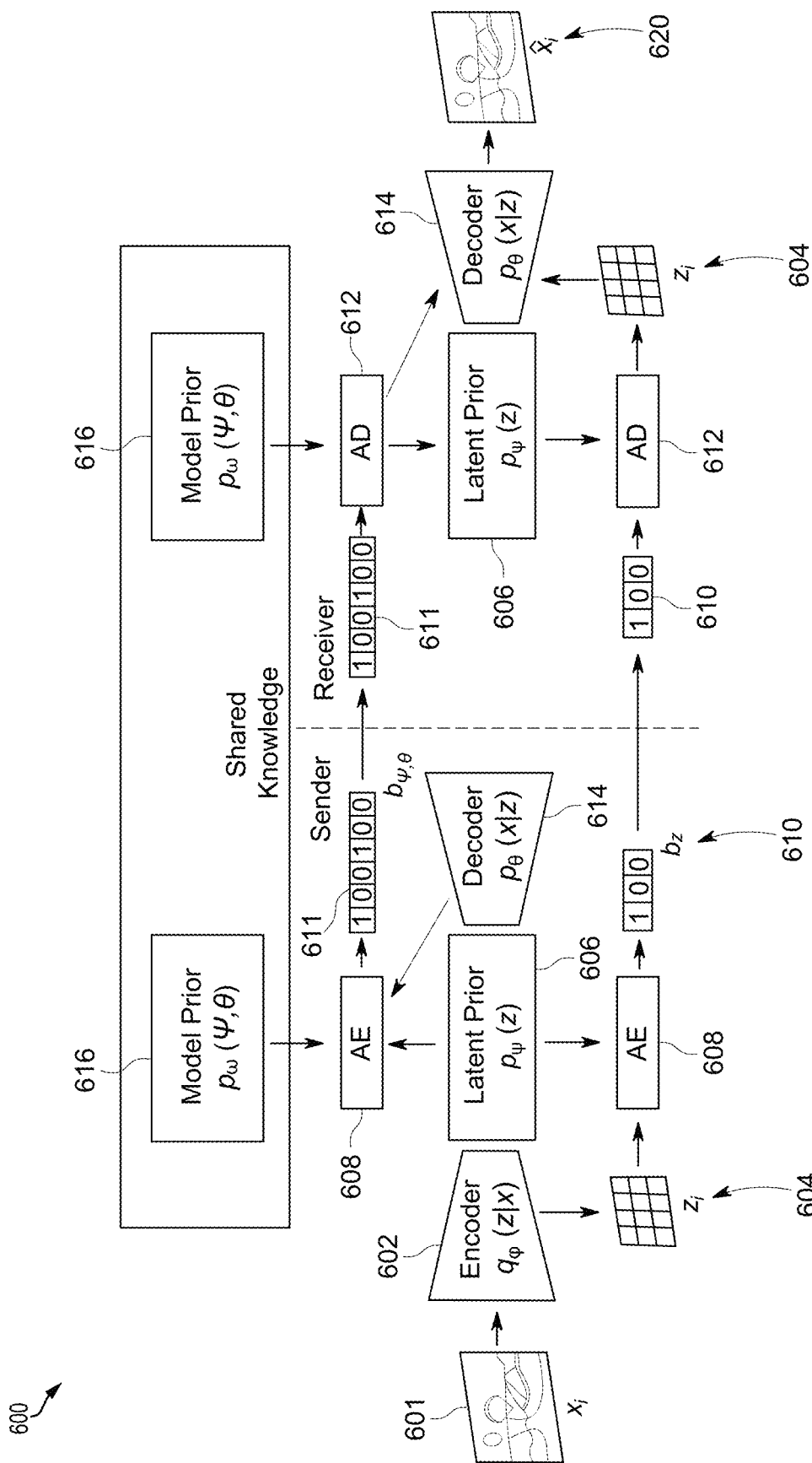
FIG. 6 is a diagram illustrating an example inference process implemented by an example neural network compression system fine-tuned using a model prior, in accordance with some examples of the present disclosure.

FIG. 6 is a diagram illustrating an example inference process implemented by an example neural network compression system 600 fine-tuned using a model prior. In some examples, the neural network compression system 600 can include an RD-AE system fine-tuned using an RDM-AE model prior. In some cases, the neural network compression system 600 can include an AE model fine-tuned using the model prior.

In this illustrative example, the neural network compression system 600 includes the encoder 602, the arithmetic encoder 608, the arithmetic decoder 612, the decoder 614, a model prior 616 and latent prior 606. In some cases, the encoder 602 can be the same as or different than encoder 402 or encoder 502, and the decoder 614 can be the same as or different than decoder 403 or decoder 514. The arithmetic encoder 608 can be the same as or different than the arithmetic coder 406 or the arithmetic encoder 508 and the arithmetic decoder 612 can be the same as or different than the arithmetic decoder 426 or the arithmetic decoder 512.

The neural network compression system 600 can generate latent code 604 (latent $z_i$) for the image 601. The neural network compression system 600 can use the latent code 604 and the latent prior 606 to encode the image 601 (image $x_i$) and generate a bitstream 610 that can be used by a receiver to generate a reconstruction image 620 (reconstruction $\hat{x}_i$). In some examples, the image 601 can represent a still image and/or a video frame associated with a sequence of frames (e.g., a video).

In some examples, the neural network compression system 600 can be fine-tuned using an RDM-AE loss. The neural network compression system 600 can be trained by minimizing the rate-distortion-model rate (RDM) loss. In some examples, at the encoder side, the AE model can be fine-tuned on the image 601 (image $x_i$) using an RDM loss as follows: $\varphi_D^*, \psi_D^*, \theta_D^* = \text{argmin } L_{RD}(x; \varphi, \psi, \theta, \omega)$.

The fine-tuned encoder 602 can encode the image 601 (image $x_i$) to generate a latent code 604. In some cases, the fine-tuned encoder 602 can encode the image 601 (image $x_i$) using a single forward pass as follows $z = q_{\varphi_x^*}(z|x)$. The arithmetic encoder 608 can use the latent prior 606 to convert the latent code 604 into a bitstream 610 for the arithmetic decoder 612. The arithmetic encoder 608 can entropy-code parameters of the fine-tuned decoder 614 and the fine-tuned latent prior 606 under the model prior 616, and generate a bitstream 611 including the compressed parameters of the fine-tuned decoder 614 and the fine-tuned latent prior 606. In some examples, the bitstream 611 can include updated parameters of the fine-tuned decoder 614 and the fine-tuned latent prior 606. The updated parameters can include, for example, parameter updates relative to a baseline decoder and latent prior, such as the decoder 614 and latent prior 606 prior to fine-tuning.

In some cases, the fine-tuned latent prior 606 can be entropy-coded under the model prior 616 as follows $b_\psi^i = AE(\psi_x^*|p_\omega(\psi))$, the fine-tuned decoder 614 can be entropy-coded under the model prior 616 as follows $b_\theta^i = AE(\theta_x^*|p_\omega(\theta))$ OA and the latent code 604 (latent $z_i$) can be entropy-coded under the fine-tuned latent prior 606 as follows $b_z^i = AE(z|p_{\psi_x^*}(z))$. In some cases, at the decoder side, the fine-tuned latent prior 606 can be entropy-coded under the model prior 616 as follows $\psi_x^* = AD(b_\psi^i|p_\omega(\psi))$, the fine-tuned decoder 614 can be entropy-coded under the model prior 616 as follows $\theta_x^* = AD(b_\theta^i|p_\omega(\theta))$, and the latent code 604 (latent $z_i$) can be entropy-coded under the fine-tuned latent prior 606 as follows $$z = AD(b_z^i|p_{\psi_x^*}(z)).$$

The decoder 614 can decode the latent code 604 (latent $z_i$) into approximate reconstruction image 620 (reconstruction $\hat{x}_i$). In some examples, the decoder 614 can decode the latent code 604 using a single forward pass of the fine-tuned decoder as follows $$\hat{x} = p_{\theta_x^*}(x|z).$$

As previously explained, the neural network compression system 600 can be trained by minimizing the RDM loss. In some cases, the rate can reflect the length of the bitstream b (e.g., bitstream 610 and/or 611), distortion can reflect the distortion between the input image 601 (image $x_i$) and the reconstruction image 620 (reconstruction $\hat{x}_i$), and the model-rate can reflect the length of the bitstream used and/or needed to send model updates (e.g., updated parameters) to a receiver (e.g., to decoder 614). A parameter β can be used to train a model for a specific rate-distortion ratio.

In some examples, a loss for the datapoint x can be minimized at inference time as follows: $\psi_x^*$, $\psi_x^*$, $\theta_x^*$=argmin $\mathcal{L}_{RDM}$(x; φ, ψ, θ, ω). In some examples, the RDM loss can be denoted as follows: L_RDM (x; φ, ψ, θ, ω)=$E_{q\varphi}$q_(z|x) [−log $p_\theta$(x|z)−β log $p_\psi$(z)−β log $p_\omega$(ψ, θ)]. In some cases, the distortion D(x|z; θ) can be determined based on a loss function such as, for example, a mean squared error (MSE).

The terms −log $p_\theta$(x|z) can indicate and/or represent the distortion D(x|z; θ). The terms β log $p_\psi$(z) can indicate and/or represent the rate for sending latents $R_z$(z; ψ), and the terms β log $p_\omega$(ψ, θ) can indicate and/or represent the rate for sending fine-tuned model updates $R_{\psi,\theta}$(ψ, θ; ω).

In some cases, the model prior 616 can reflect the length of the bitrate overhead for sending model updates. In some examples, the bitrate for sending model updates can be described as follows: $|b_{\psi,\theta}^i|=R_{\psi,\theta}(\psi,\theta;\omega)$=−log $p_\omega$(ψ, θ). In some cases, the model prior can be selected so that sending a model without updates is cheap, that is, the bit length (model-rate-loss) is small: $R_{\psi,\theta}(\psi_D^*,\theta_D^*,\omega)$.

In some cases, using the RDM loss function, the neural network compression system 600 may only add bits to the bitstream for the model updates $b_{\psi,\theta}^i$ if the latent rate or distortion decreases with at least as many bits. This may provide a boost to rate-distortion (R/D) performance. For example, the neural network compression system 600 may increase the number of bits in the bitstream 611 for sending model updates if it can also decrease the rate or distortion with at least the same number of bits. In other cases, the neural network compression system 600 may add bits to the bitstream for the model updates $b_{\psi,\theta}^i$ even if the latent rate or distortion does not decrease with at least as many bits.

The neural network compression system 600 can be trained end-to-end. In some cases, the RDM loss can be minimized at inference time end-to-end. In some examples, a certain amount of compute can be spent once (e.g., fine-tuning the model) and high compression ratios can be subsequently obtained without extra cost to the receiver side. For example, a content provider may spend a high amount of compute to more extensively train and fine-tune the neural network compression system 600 for a video that will be provided to a large number of receivers. The highly trained and fine-tuned neural network compression system 600 can provide a high compression performance for that video. Having spent the high amount of compute, the video provider can store the updated parameters of the model prior and efficiently provide to each receiver of the compressed video to decompress the video. The video provider can achieve large benefits in compression (and reduction in network and compute resources) with each transmission of the video which can significantly outweigh the initial compute costs of training and fine-tuning the model.

Due to the large number of pixels in video and images (e.g., high resolution images), the training/learning and fine-tuning approaches described above can be very advantageous for video compression and/or high resolution images. In some cases, complexity and/or decoder compute can be used as added considerations for the overall system design and/or implementation. For example, very small networks that are fast to do inference on can be fine-tuned. As another example, a cost term can be added for receiver complexity, which can force and/or cause the model to remove one or more layers. In some examples, more complex model priors can be learned using machine learning to achieve even larger gains.

A model prior design can include various attributes. In some examples, the model prior implemented can include a model prior that assigns a high probability $p_\omega(\psi_D^*,\theta_D^*)$ for sending a model without any updates, and thus a low bitrate: $R_{\psi,\theta}(\psi_D^*,\theta_D^*;\omega)$. In some cases, the model prior can include a model prior that assigns a non-zero probability to values around $\psi_D^*$, $\theta_D^*$ so different instances of fine-tuned models can be encoded in practice. In some cases, the model prior can include a model prior that can be quantized at inference time and used to do entropy coding.

Despite accelerated research developments, deep learning based compression coder-decoders (referred to as "codecs") have not yet been deployed in commercial or consumer applications. One reason for this is that neural codecs have yet to robustly outperform traditional codecs in terms of rate-distortion. In addition, existing neural based codecs present further implementation challenges. For example, neural based codecs require a trained neural network on all receivers. Consequently, all users across different platforms must store an identical copy of such a neural network in order to perform the decoding function. Storage of such a neural network consumes a significant amount of memory, is difficult to maintain, and is vulnerable to corruption.

As noted above, systems and techniques are described herein that include an implicit neural compression codec, which can address the above-noted issues. For instance, aspects of the present disclosure include a video compression codec based on implicit neural representations (INR), which can be referred to as an implicit neural model. As described herein, the implicit neural model can take coordinate positions (e.g., coordinates within an image or video frame) as input and can output pixel values (e.g., color values for the image or video frame, such as red-green-blue (RGB) values for each coordinate position or pixel). In some cases, the implicit neural model can also be based on an IPB-frame scheme. In some examples, the implicit neural model can modify input data to model optical flow, referred to as implicit neural optical flow (INOF).

For instance, the implicit neural model can model optical flow with implicit neural representations in which local translations can amount to elementwise addition. In some cases, an optical flow can correspond to a local translation (e.g., movement of pixels as a function of position). In some aspects, optical flows can be modeled across frames of video to improve compression performance. In some cases, an implicit model can model optical flow by adjusting the input coordinate positions to yield corresponding output pixel values. For instance, elementwise addition of the inputs can lead to local translation at the output, which can eliminate the need and associated computational complexity of pixel movement. In one illustrative example, a transition from a first frame having three pixels (e.g., P1|P2|P3) and a second frame having three pixels (e.g., P0|P1|P2) can be modeled by an implicit neural model by modifying the input (e.g., without need to shift the position of the pixels), such as by performing elementwise subtraction or addition. The following diagram illustrates this example:

1|2|3→P1|P2|P3
0|1|2→P0|P1|P2

As noted above, the implicit neural model can take coordinate positions of an image or video frame as input and can output pixel values for the image or video frame. In this case, the inputs (1|2|3 and 0|1|2) represent the input to the implicit neural model, and include coordinates within an image. The outputs (P1|P2|P3) and (P0|P1|P2) represent the output of the implicit neural model, and can include RGB values. Each of the above two lines (1|2|3→P1|P2|P3 and 0|1|2→P0|P1|P2) corresponds to the same model in which the inputs changed by a value of '1' causing a corresponding shift in the outputs. With traditional optical flow, the machine learning model itself has to shift the position of the pixels from one frame to the next. Because the implicit machine learning model takes coordinates as input, the input can be pre-processed (prior to being processed by the codec) to subtract every input value by 1, in which case the output will be shifted and thus will effectively model the optical flow. In some cases, elementwise addition can be performed (e.g., when the objects in the frame move in a particular direction), in which a value (e.g., a value of 1) will be added to the input values.

In some examples, residuals can be modeled across frames with weight updates of an implicit neural model. In some cases, the present technology can be used to reduce the bitrate required for compressing inter-predicted frames (e.g., uni-directional frames (P-frames) and/or bi-directional frames (B-frames). In some examples, a convolution-based architecture can be used to process intra-frames (e.g., Intra-frames or I-frames. A convolution-based architecture can be used to dissolve the decoding compute bottleneck of implicit models, yielding a resulting model that is fast to encode and decode. In some aspects, converting data into bit streams can be performed with post-training quantization for I-frames and quantization-aware training for P and B frames.

In some cases, the model can be quantized and/or encoded to form a complete neural compression codec. In some examples, the model can be sent to a receiver. In some cases, fine-tuning of the model can be performed on P and B frames and converged updates can be sent to a receiver. In some aspects, the model can be fine-tuned with a sparsity inducing prior and/or a quantization-aware procedure that can minimize the bitrates for P and B frames. Compared to existing neural compression codecs, the implicit neural model based neural compression codec eliminates the requirement for a pretrained network at the receiver side (and at the transmitter side in some cases). The performance of the present technology compares favorably against traditional and neural based codecs on both image and video dataset with enhanced performance over previous INR-based neural codecs.

In some aspects, an implicit neural representation (INR) method/model can be used for video and image compression. Videos or images can be represented as a function, which can be implemented as a neural network. In some examples, encoding an image or video can include choosing an architecture and overfitting the network weights on the single image or video. In some examples, decoding can include a neural network forward passes. One challenge of implicit neural models used for compression is decoding computational efficiency. Most existing implicit neural models require one forward pass for each pixel in the input data. In some aspects, the present technology includes a convolutional architecture as a generalization of implicit neural representation models that can reduce the computational overhead associated with decoding a high resolution video or image, thus reducing the decoding time and memory requirement.

In some examples, the bitrate can be determined by the size of the stored model weights. In some cases, in order to improve the performance of the implicit neural approach disclosed herein, the model size can be reduced in order to improve the bitrate. In some configurations, reducing the model size can be performed by quantizing the weights, and fitting a weight prior that can be used to losslessly compress the quantized network weights.

In some cases, the present technology can match the compression performance of state-of-the-art neural image and video codecs. One exemplary advantage of the codec as disclosed herein is that it can eliminate the need to store a neural network on the receiver side, and can be implemented with a lightweight framework. Another advantage (e.g., compared to scale-space flow (SSF)-like neural codecs) is the absence of flow operations, which can be difficult to implement in hardware. In addition, the decoding function can be faster than in standard neural codecs. Furthermore, the present technology does not require a separate training dataset because it can be trained implicitly using the data that is to be encoded (e.g., the current instance of an image, video frame, video, etc.). The configuration of the implicit neural model described herein can help to avoid potential privacy concerns and performs well on data from different domains, including those for which no suitable training data is available.

In one example related to neural compression codes, neural video compression can be implemented using the framework of variational or compressive autoencoders. Such models are configured to optimize the rate-distortion (RD) loss as follows:

$$\mathcal{L}_{RD}(\phi, \theta) = \mathbb{E}_{x \sim p(x)}\left[\beta \underbrace{\mathbb{E}_{z \sim q_\phi(z|x)}[-\log p_\theta(z)]}_{R} + \underbrace{\mathbb{E}_{z \sim q_\phi(z|x)}[-\log p_\theta(x|z)]}_{D}\right] \quad (1)$$

In this example, the encoder $q_\phi$ maps each instance x to a latent z, and the decoder p recovers a reconstruction. Assuming the trained decoder is available at receiver side, the transmitted bitstream then includes the encoded latent z. Examples of this type of configuration include 3D convolution architectures and IP-frame flow architecture, which condition each P-frame on the previous frames. Another example includes instance-adaptive fine-tuning in which the model is fine-tuned on each test instance, and the model is transmitted with the latents. While this method can include advantages over previous work (e.g., robustness to domain shift and reduction of model size) it still requires a pretrained global decoder to be available at the receiver size.

In another example related to neural compression codecs, a model can be used to compress images through their implicit representation as neural network weights. This configuration implements sinusoidal representation networks (SIREN) based models with varying numbers of layers and channels and quantizes them to 16-bit precision. The implicit neural codec described differs from other systems that may use SIREN models for image compression tasks. For instance, in some examples, the implicit neural codec described herein can include convolutional architectures with positional encodings, can implement more advanced compression schemes including quantization and entropy coding, and can perform video compression.

In one example relating to implicit neural representation, implicit representations have been used for learning three-dimensional structures and light fields. In some instances, these configurations can train a neural network on a single scene such that it is encoded by the network weights. New views of the scene can then be generated through a forward pass of the network. In some aspects, these methods can be more efficient than discrete counterparts because when object data lies on a low-dimensional manifold in the high-dimensional coordinate frame, there is high redundancy in the discrete representation, where a value is associated with each set of coordinates. In some examples, implicit neural representations are able to exploit such redundancies and thereby learn more efficient representations.

While implicit representations may be applied to data with lower-dimensional coordinates such as images and videos, the relative efficiency compared to discrete or latent representations is not yet determined. Furthermore, the performance of existing configurations that use implicit representations needs to match or exceed the performance of configuration that use discrete representations or with established compression codecs.

Regardless of the dimension of input data, choosing the right class of representations is important. In some examples, Fourier domain features are conducive to implicit neural models learning the structure of realistic scenes. For instance, Fourier domain features have been implemented for natural language processing, where Fourier positional encoding of words in a sentence is shown to enable then state-of-the-art language modeling with fully attentional architectures. In addition, with respect to implicit neural modeling of vision tasks, a configuration can use randomly sampled Fourier frequencies as encoder prior to passing in MLP model. Further, some configurations include all MLP activations that can be sinusoidal functions, provided that the weights are initialized carefully. where $X_{int}$ is a integer tensor with b bits and s is a scaling factor (or vector) in floating point.

In some examples, neural network quantization can be used to reduce the model size to facilitate running models more efficiently on resource constrained devices. Examples of neural network quantization include vector quantization, which can represent a quantized tensor using a code book and fixed-point quantization, which can represent a tensor with a fixed-point number that includes an integer tensor and a scaling factor. In fixed-point, the quantization function can be defined as:

$$Q_{s,b}(\theta) := s \cdot \theta_{int} = s \cdot \text{clamp}\left(\left[\frac{\theta}{s}\right]; 2^{b-1}, 2^{b-1} - 1\right) \quad (2)$$

where $\theta_{int}$ is a integer tensor with b bits and s is a scaling factor (or vector) in floating point. In some aspects, the symbol τ=(s,b) can be used to refer to the set of all quantization parameters, In some examples, low bit quantization of weight tensors (e.g., all weight tensors) in a neural network can incur significant quantization noise. With quantization-aware training, neural networks can adapt to the quantization noise by training them end-to-end with the quantization operation. As the rounding operation in equation 2 is non-differentiable, commonly a straight-trough estimator (STE) is used to approximate its gradient. In some cases, in addition to learning the scaling factors jointly with the network, learning a per-tensor bit-width for every layer can also be performed. In some aspects, the present technology can formulate the quantization bit-width as a rate loss and can minimize the RD-loss to implicitly learn the best trade-off between bitrate and the distortion in pixel space.

Figure 7A:
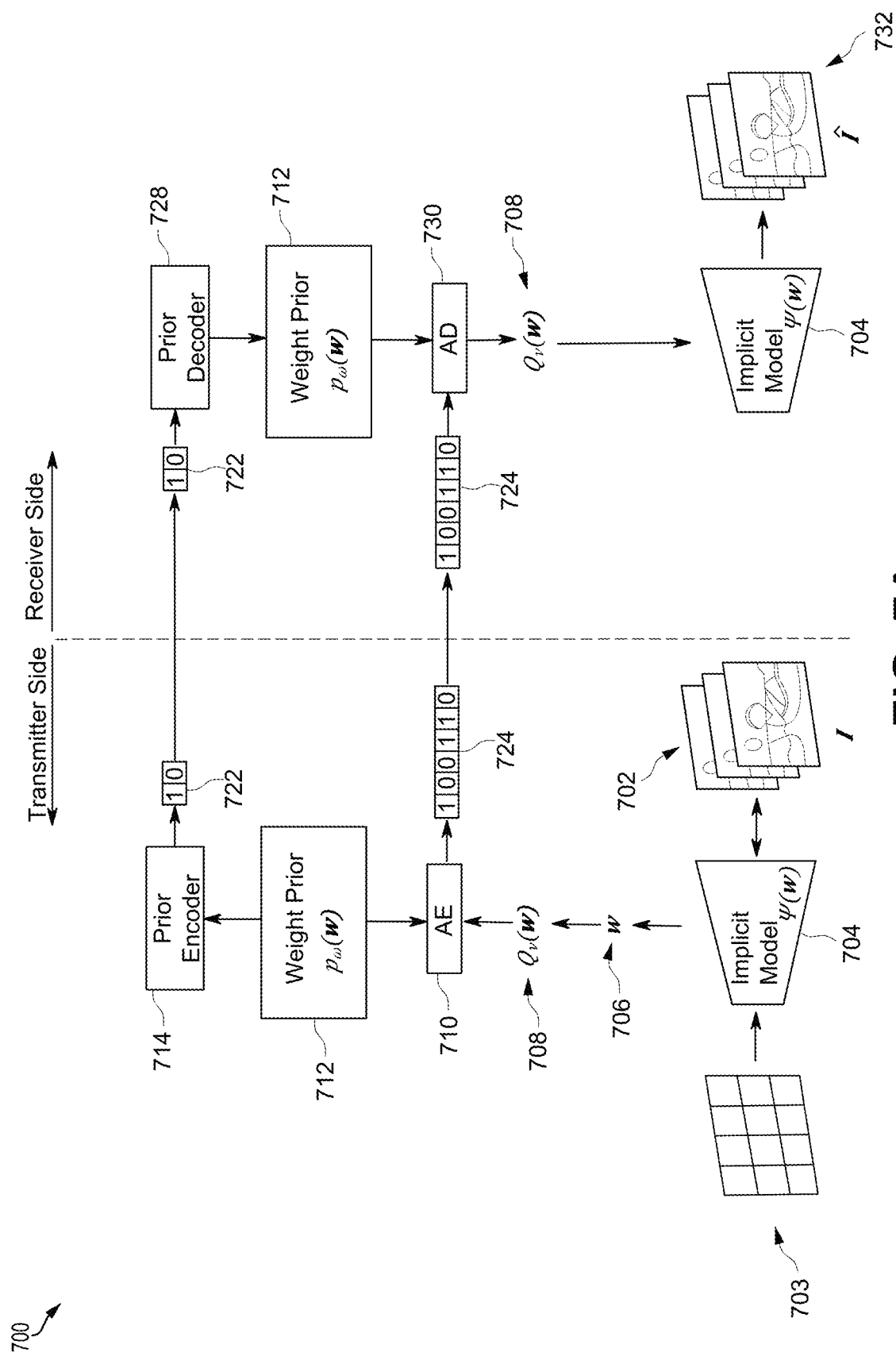
FIG. 7A is a diagram illustrating an example image compression codec based on implicit neural representations, in accordance with some examples of the present disclosure.

FIG. 7A is a diagram illustrating an example codec based on an implicit neural network compression system 700. In some aspects, the implicit neural compression system 700 can include a pipeline for training implicit compression models that are configured to optimize distortion and/or bitrate. In some examples, the distortion can be minimized by training the weights w 706 of the implicit model Ψ(w) 704 on a distortion objective. In some aspects, the rate can be minimized by quantizing the weights 706 with a quantization function $Q_τ(w)$, and by fitting a weight prior $p_w[\overline{w}]$ 712 over the quantized weights 708. In some example, these components can be combined into a single objective that reflects a Rate-Distortion loss, as follows:

$$\mathcal{L}_{NIC}(\Psi, \omega, \tau, \omega) = \underbrace{\|\Psi(Q_\tau(\omega)) - x\|_2^2}_{D} + \underbrace{p_\omega[Q_\tau(\omega)]}_{R} \quad (3)$$

In some examples, a first step of "encoding" a datapoint x (e.g., corresponding to input image data 702, which can include an image or a plurality of images) is to find the minimum of the loss in Equation (3) for the datapoint (e.g., input image data 702). In some cases, the minimum of the loss can be obtained using a searching and/or training algorithm. For example, as shown in FIG. 7A, to train an implicit neural model 704 on the transmitter side, a coordinate grid 703 is input to the implicit model 704. Before training, the weights of the implicit model 704 are initialized to initial values. The initial values of the weights are used to process the coordinate grid 703 and to generate reconstructed output values (e.g., RGB values for each pixel) for the input image data 702, represented as Ψ($Q_τ$(ω))) in Equation (3). The actual input image data 702 that are being compressed can be used as a known output (or label), represented as datapoint x in Equation (3). The loss ( $\mathcal{L}_{NIC}$(Ψ, ω, τ, ω)) can then be determined between the reconstructed output values (Ψ($Q_τ$(ω))) and the known output (datapoint x, which is input image data 702 in FIG. 7A). Based on the loss, the weights of the implicit model 704 can be tuned (e.g., based on a backpropagation training technique). Such a process can be performed a certain number of iterations until the weights are tuned such that a certain loss value is obtained (e.g., a minimized loss value). Once the implicit model 704 is trained, the weights w 706 from the implicit model 704 can be output, as shown in FIG. 7A. On the receiver side, the coordinate grid 703 can be processed using the implicit model 704 tuned with decoded weights w after dequantization (or using quantized weights 708). In some cases, the architecture parameters (Ψ(w)) of the implicit model 704 can be determined based on decoding of the bitstream 720 by the architecture decoder 726.

In some aspects, a first step can include determining the optimal implicit model 704 to use (out of a group of available implicit models) for compressing the input image data 702 by searching over network architectures Ψ(•) and training the weights w 706 for each model by minimizing the D loss without quantization. In some examples, this process can be used to select implicit model 704.

In some cases, a quantizer can be implemented to achieve an optimal distortion D based on the quantizer hyperparameters τ. In some aspects, implicit model Ψ(w) 704 can be fine-tuned based on quantized weights 708.

In some examples, a weight prior 712 can be implemented while fixing the quantizer parameters and the implicit model weights (e.g., quantized weights 708 or weights 706). In some aspects, the weight prior 712 can be used to determine optimal settings (including weights w 706) that minimize the rate loss R.

In some aspects, implicit neural network compression system 700 can be used as an image or video codec that can be configured to encode the weight prior parameters w 712 in the bitstream 722 (using prior encoder 714) and encode the quantized weights $\overline{w}$ 708 using entropy coding (by the arithmetic encoder (AE) 710) under the weight prior $p_w[\overline{w}]$ 712 in the bitstream 724. In some examples, decoding can be implemented in an inverse fashion. For instance, on the receiver/decoder side, the arithmetic decoder (AD) 730 can use the decoded weight prior (decoded by prior decoder 728) to perform entropy decoding to decode the bitstream 724 and generate the weights (e.g., weights 706 or quantized weights 708). Using the weights and the neural network model architecture (e.g., Ψ(w)), the implicit model 704 can generate output image data 732. In one example, once Ψ(•) and $\overline{w}$ are decoded the reconstruction z can be obtained using a forward pass: $\hat{x}=\Psi(w)$.

As noted above, implicit model 704 can include one or more neural network architectures that can be selected by training weights w 706 and determining a minimum distortion. In one example, the implicit model 704 can include a multi-layer perceptron (MLP) that takes coordinates within an image as input and returns RGB values (or other color values), as follows:

$$f: \mathbb{R}^2 \to \mathbb{R}^3, \qquad (4)$$

$$(x, y) \to f_\theta(x, y) = \begin{pmatrix} r(x, y) \\ g(x, y) \\ b(x, y) \end{pmatrix}$$

In some aspects, implicit model 704 can implement a SIREN architecture that can use periodic activation functions to ensure that fine details in images and videos can be represented accurately. In some examples, decoding an image can include evaluating the MLP at every pixel location (x, y) of interest. In some cases, the representation can be trained or evaluated at different resolution settings or on any type of pixel grid (e.g., irregular grids) because the representation is continuous.

In some examples, the implicit model 704 can include a convolutional network, which can be used to improve computational efficiency of the codes (e.g., particularly on receiver side). In some cases, an MLP-based implicit neural model can require a forward pass for each input pixel coordinate, which can result in many (e.g., approximately two million) forward passes for decoding each frame of a 1K resolution video.

In some aspects, an MLP-based implicit neural model can be viewed as a convolution operation with 1×1 kernels. In some examples, the techniques described herein can generalize implicit models to convolutional architecture.

Unlike MLPs, which process one coordinate at a time, the present technology can lay out all coordinates at once, with the coordinate values in the channel axis. In some aspects, the present technology can use 3×3 kernels and a stride value of 2 (e.g., indicating that a convolutional kernel or filter is moved two positions after each convolutional operation) for the transpose convolution blocks, which can result in $2^{2L}$ times reduction in the number of forward passes needed to reconstruct an image, where L is the number of convolutional layers.

In some examples, random Fourier encoding and SIREN architectures can be generalized in this way. For example, the first layer in the convolutional architecture can include a positional encoding of the coordinates, as follows $$h_{xy}^c = \begin{cases} \sin\left(2\pi \sum_i \omega_i^c x_i\right) & c \le N_\omega \\ \cos\left(2\pi \sum_i \omega_i^{c-N_w} x_i\right) & c > N_\omega \end{cases} \qquad (5)$$

where c, i are indices along the channel and spatial dimensions, $\omega_i^c \sim N(\cdot|0,\omega_0^2)$, $0 \le c < 2N_\omega$ are $N_\omega$ frequencies samples from a Gaussian distribution. The standard deviation and the number of frequencies are hyperparameters. This positional encoding can be followed by alternating transposed convolutions and ReLU activations.

In some aspects, the convolutional models from the present technology can easily process high resolution images with an arbitrarily low number of forward passes, thus speeding up both encoding and decoding. It is also much more memory efficient at high bit rates. In some examples, training 3×3 convolutional kernels at ultra-low bitrates can be implemented using different convolutional kernels (e.g., 1×1 and/or 3×3 convolutions in the pipeline).

As noted above, input to neural network compression system 700 can include image data 702 (e.g., to train the implicit model), which can include video data. In some examples, video data can have strong redundancies between subsequent frames. In existing video codecs, a group of pictures (GoP) is often compressed in a way such that each frame is dependent on the previous. Specifically, a new frame prediction can be formulated as the sum of a warping of previous frame and residuals. The present technology can implement an analogous configuration for use with the implicit-neural compression scheme. In some cases, implicit models have been shown to represent warping with accuracy. In some aspects, the present technology can use temporal redundancy that can be implicitly leveraged sharing weights across frames. In some aspects, a fully implicit approach (as disclosed herein) can have the advantage of conceptual simplicity and architecture freedom.

In some examples, implicit video representations can be implemented using groups of pictures. For instance, videos can be divided into groups of N frames (or pictures) and each batch can be compressed with a separate network. In some cases, this implementation reduces the required expressivity of the implicit representations. In some examples, this implementation can enable buffered streaming, as only one small network needs to be sent before the next N frames can be decoded.

In some aspects, implicit video representation can be implemented using a 3D MLP. For example, the MLP representation can easily be extended to video data by adding a third input that represents the frame number (or time component) t. In some examples, a SIREN architecture can be used with sine activations.

In some cases, implicit video representation can be implemented using 3D convolutional networks. As previously noted, 3D MLP can be seen as a 1×1×1 convolution operation. Similar to the 2 dimensional case, the present technology can implement 3D MLPs into convolutional operations with 3 dimensional kernels. To keep number of parameters to a minimum, the present technology can use spatial kernels of size k×k×1, followed by frame-wise kernels of shape 1×1× k'.

With regard to the Fourier encoding in Equation 5, the additional coordinate can be considered by setting $x_i$ be [t, x, y] and introducing extra frequencies accordingly. Since the time and space correlation scales are likely very different, the present technology can let the time-conjugate frequency variances be a separate hyper-parameter. A sequence of three-dimensional transposed convolutions alternating with ReLU activations can process the positional encoding features into a video sequence.

In some aspects, implicit video representation can be implemented using time-modulated networks, which corresponds to an implicit representation that can be adapt the representation to work on a set of data, rather than a single instance. In some examples, methods can include the use of hypernetwork, as well as latent-based methods. In some cases, the present technology can use time-modulated networks to generalize our instance model to frames in a video (instead of a set of data points). In some examples, the present technology can implement a synthesis-modulator composite network architecture for their conceptual simplicity and parameter sharing efficiency. While prior implementations have found that the SIREN MLP is unable to make high quality reconstructions at high resolutions, and thus split up the image into overlapping spatial tiles for weight sharing purposes, the present technology implements a convolutional SIREN architecture that can generate high resolution frames. In some cases, the present technology can reserve the modulation along the frame axis only. In this approach, the inputs to the model are still just the spatial coordinates (x, y). However, the k-th layer of this network is given by $$h_{k+1} = \sigma(\mathcal{F}[h_k \odot g_k(z_t)]) \quad (6)$$

here σ(•) is the activation function, $\mathcal{F}$ is the neural network layer including either 3×3 or 1×1 convolutions, $z_t$ is a learnable latent vector for each frame, and $g_k$(•) denotes the k th layer output of the modulation MLP. The elementwise multiplicative interactions allow modeling complex time dependencies.

Figure 9:
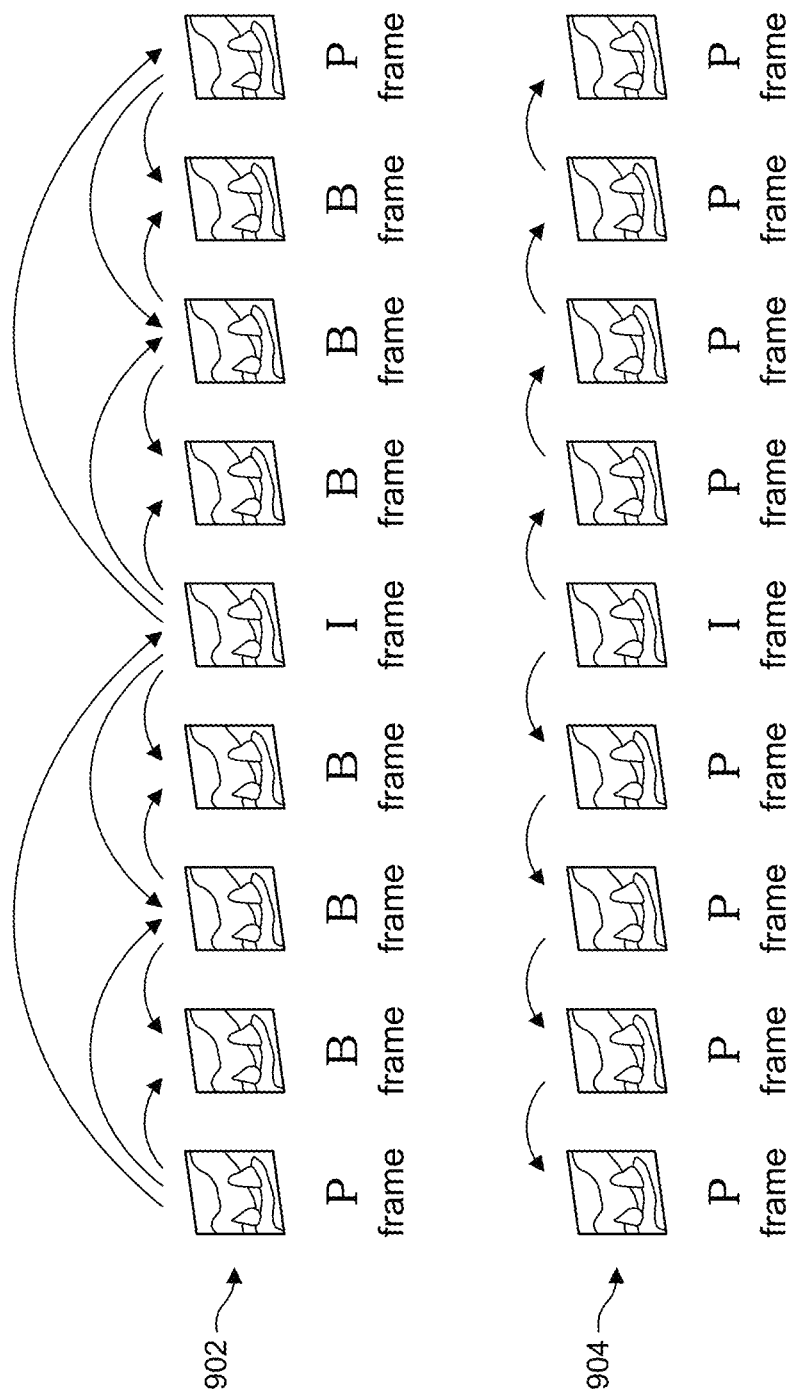
FIG. 9 is a diagram illustrating a video frame encoding order, in accordance with some examples of the present disclosure.

In some examples, implicit video representation can be implemented using a configuration based on IPB-frame breakdown and/or an IP-frame breakdown. Referring to FIG. 9, a group of successive frames 902 can be encoded (e.g., using IPB-frame breakdown) by first compressing the middle frame as I frame. Next, starting from the trained I frame implicit model, the present technology can finetune on the first and last frames as P-frames. In some examples, finetuning on the first and last frames can include using a sparsity-inducing prior and quantization aware fine-tuning to minimize bit rate. In some aspects, the remaining frames can be encoded as B frames. In some examples, the IPB-frame breakdown can be implemented by initializing the model weights as the interpolation of model weights on either side of the frame. In some cases, the overall bitstream can include quantized parameters of I frame model that are encoded with fitted model prior and quantized updates for the P and B frames, encoded with sparsity inducing priors. In some examples, the implicit video representation can be implemented using an IP-frame breakdown, as illustrated by frames 904 in FIG. 9.

Returning to FIG. 7A, neural network compression system 700 can implement a quantization algorithm that can be used to quantize weights 706 to yield quantized weights 708. In some aspects, network quantization can be used to reduce the model size by quantizing every weight tensor $w^{(i)} \in w$ using fixed-point representation. In some cases, the quantization parameter and bit-width can be learned jointly; e.g., by learning the scale s and the clipping threshold $q_{max}$. The bit-width b is then implicitly defined as b(s, $q_{max}$)=$\log_2$($q_{max}$+1). showed that this parameterization is favorable over learning the bit-width directly as it does not suffer from an unbounded gradient norm.

In some examples, encoding the bitstream can include encoding all quantization parameters $\tau = \{s^{(i)}, b^{(i)}\}_{i=L}^{L}$ and all integer tensors $w_{int} = \{w_{int}^{(i)}\}_{i=1}^{L}$. All $s^{(i)}$ are encoded as 32 bit floating point variable, the bit-widths $b^{(i)}$ as INT4 and the integer tensors $w_{int}^{(i)}$ in their respective bit-width $b^{(i)}$.

In some aspects, neural network compression system 700 can implement entropy coding. For example, the last training stage can include the arithmetic encoder (AE) 710 fitting a prior over the weights (e.g., weights 706 or quantized weights 708) to generate the bitstream 724. As noted above, on the receiver/decoder side, the arithmetic decoder (AD) 730 can use the decoded weight prior (decoded by prior decoder 728) to perform entropy decoding to decode the bitstream 724 and generate the weights (e.g., weights 706 or quantized weights 708). Using the weights and the neural network model architecture, the implicit model 704 can generate output image data 732. In some cases, the weights can be approximately distributed as a 0-centered Gaussian for the majority of tensors. In some examples, the scale of every weight can be different, but since the weight ranges are part of the (transmitted) quantization parameters $q_{max}^{(i)}$, the weights can be normalized. In some cases, network compression system 700 can then fit a Gaussian to the normalized weights and use this for entropy coding (e.g., resulting in bitstream 724).

In some examples, some weights (e.g., weights 706 or quantized weights 708) are distributed sparsely. For sparsely distributed weights, neural network compression system 700 can transmit a binary mask that can be used to redistribute the probability mass only to binaries that have content. In some cases, a signal bit can be included to encode whether a mask is transmitted.

Figure 7B:
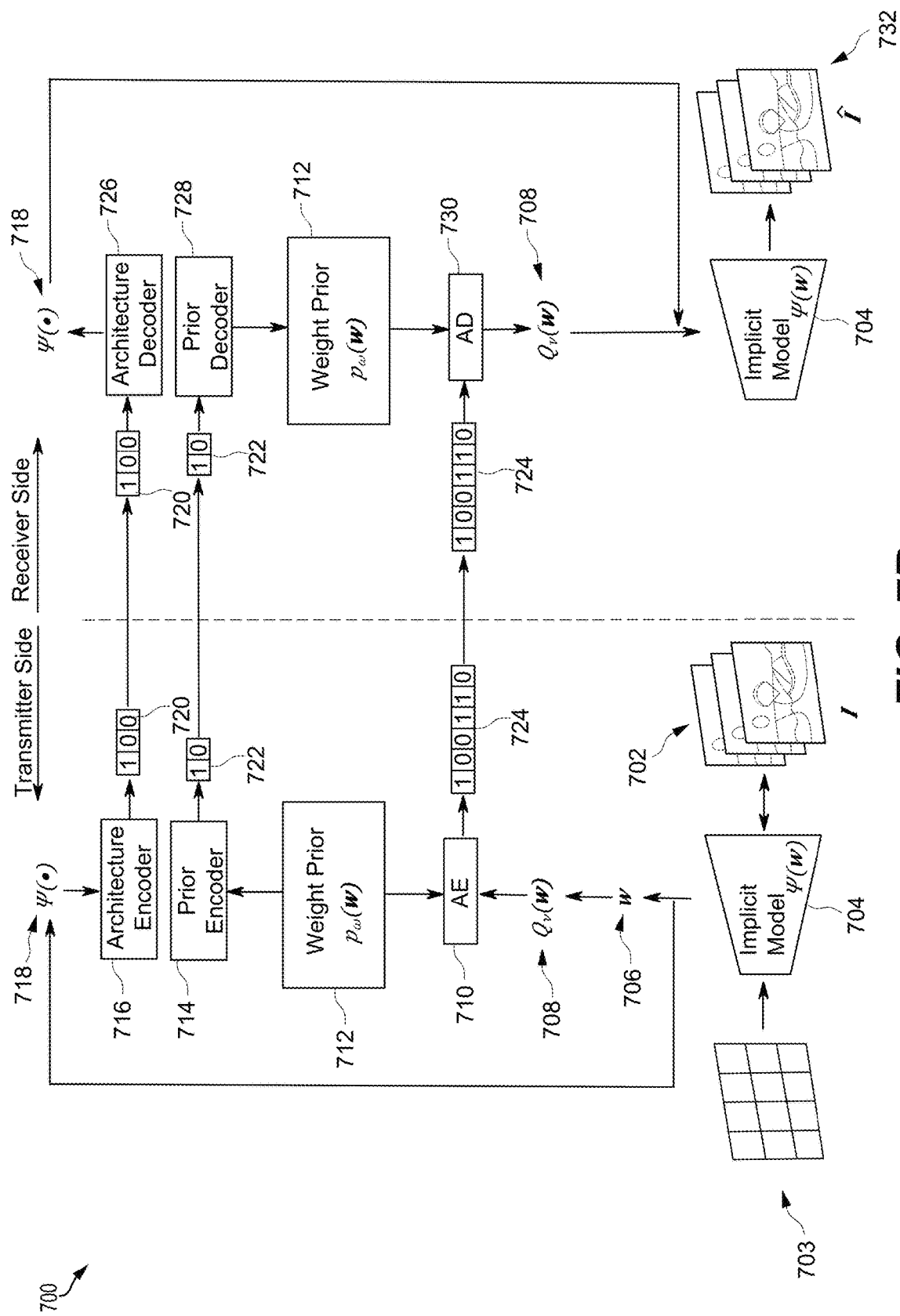
FIG. 7B is a diagram illustrating another example image compression codec based on implicit neural representations, in accordance with some examples of the present disclosure.

FIG. 7B is a diagram illustrating an example codec based on an implicit neural network compression system 700. In some aspects, the implicit neural compression system 700 can include a pipeline for training implicit compression models that are configured to optimize distortion and/or bitrate. As noted above with respect to FIG. 7A, a first step can include determining the optimal implicit model 704 to use (out of a group of available implicit models) for compressing the input image data 702 by searching over network architectures Ψ(•) and training the weights w 706 for each model by minimizing the distortion loss without quantization. In some examples, this process can be used to select implicit model 704. In some examples, implicit model 704 can be associated with one or more model characteristics that can include a model width, a model depth, a resolution, a size of a convolution kernel, an input dimension, and/or any other suitable model parameter or characteristic.

In some aspects, the receiver side (e.g., decoder) does not have prior knowledge of the network architecture Ψ(•) used to encode input image data 702. In some cases, implicit neural network compression system 700 can be configured to encode the model architecture Ψ(•) 718 in the bitstream 720 (using architecture encoder 716).

Figure 8A:
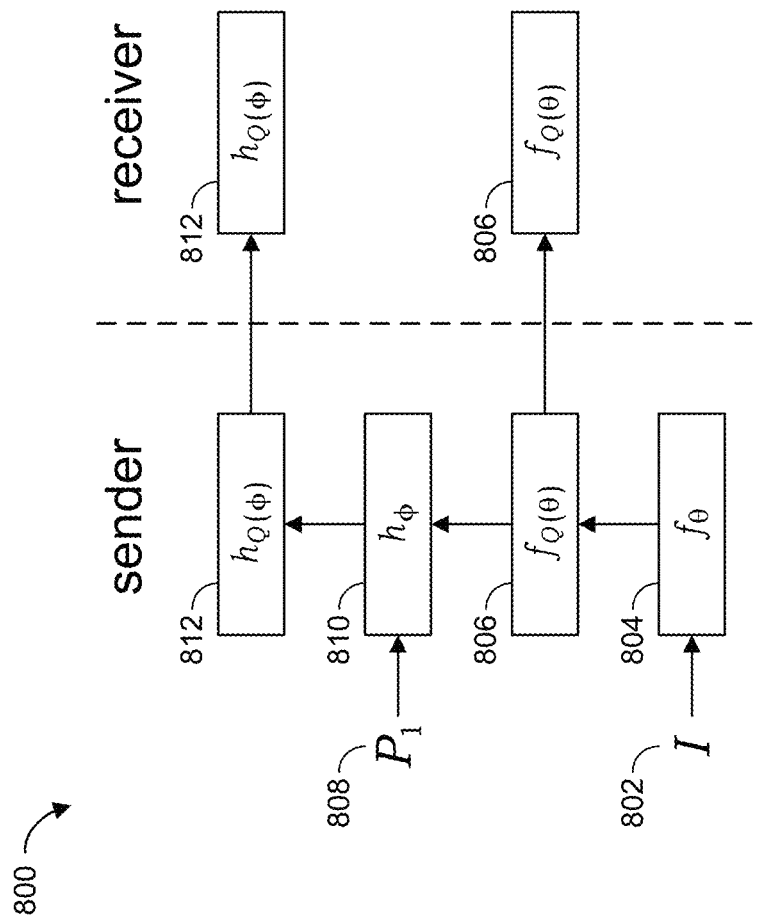
FIG. 8A is a diagram illustrating an example of a compression pipeline for a group of pictures using implicit neural representations, in accordance with some examples of the present disclosure.

FIG. 8A is a diagram illustrating an example of a pipeline 800 for a group of pictures using implicit neural representations. In some aspects, pipeline 800 can be implemented by a video compression codec that can process images using neural networks that can map coordinates associated with an input image (e.g., I frame 802 and/or P1 frame 808) to pixel values (e.g., RGB values). In some examples, the output of pipeline 800 can include compressed files having a header (e.g., used to identify the network architecture) and/or the weights of a neural network for a corresponding input frame.

In some examples, pipeline 800 can include a base model 804 (e.g., base model $f_\theta$) that can be used to compress one or more image frames from a group of frames associated with a video input. In some cases, base model 804 can include an I-frame model that is trained using a first frame from a group of frames. In some aspects, training of base model 804 can include compressing the first frame from a group of frames (e.g., an I-frame) by mapping input coordinate positions to pixel values (e.g., using Equation (4)).

In some aspects, the size of base model 804 can be reduced by quantizing one or more of the weight tensors associated with base model 804. In some examples, weight tensors can be quantized using a fixed-point quantization function such as the function from Equation (2). For example, Equation (2) can be used to quantize base model 804 to yield quantized base model 806 (e.g., quantized base model $f_{Q(\theta)}$). In some aspects, quantized base model 806 can be compressed (e.g., using an arithmetic encoder) and sent to a receiver.

In some examples, pipeline 800 can include a flow model 810 (e.g., flow model $h_\emptyset$) that can be used to determine the optical flow field between two image frames (e.g., I frame 802 and P1 frame 808). For example, flow model 810 can be configured to determine an optical flow field or motion vector (e.g., a field of displacement vectors) between consecutive image frames from a video. In some aspects, flow model 810 can be trained using a second frame from a group of frames (e.g., P1 frame 808). In some cases, the field of displacement vectors determined by flow model 810 can be applied to a previous frame to model the current frame. In some aspects, the displacement from an optical flow field can be represented as $h_\emptyset(x, y)=(\Delta x, \Delta y)$. In some cases, the displacement from an optical flow field can be applied by adding the displacement vector to the input variables according to the following:

$$(x,y) \rightarrow f_\theta \circ h_\emptyset(x,y) = f_\theta(x+\Delta_x, y+\Delta_y). \tag{7}$$

In some aspects, the size of flow model 810 can be reduced by quantizing one or more of the weight tensors associated with flow model 810. In some examples, weight tensors can be quantized using a fixed-point quantization function such as the function from Equation (2). For example, Equation (2) can be used to quantize flow model 810 to yield quantized flow model 812 (e.g., quantized flow model $h_{Q(\theta)}$). In some aspects, quantized flow model 812 can be compressed (e.g., using an arithmetic encoder) and sent to a receiver.

Figure 8B:
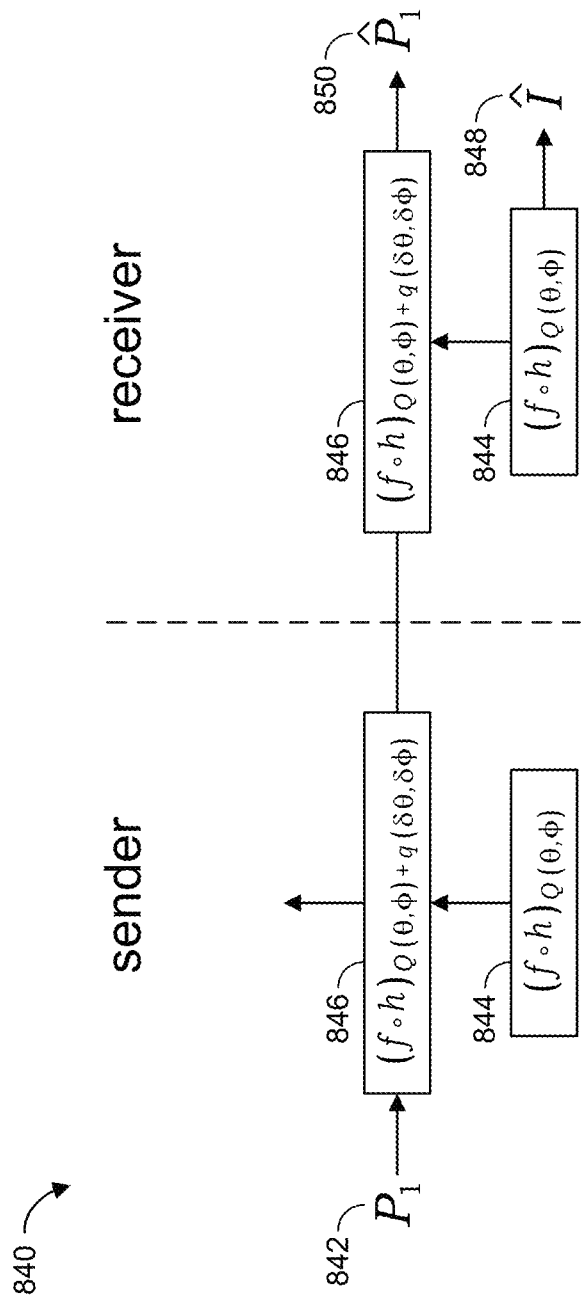
FIG. 8B is a diagram illustrating another example of a compression pipeline for a group of pictures using implicit neural representations, in accordance with some examples of the present disclosure.

FIG. 8B is a diagram illustrating an example of a pipeline 840 for a group of pictures using implicit neural representations. In some aspects, pipeline 840 can represent a second pipeline phase that can follow the pipeline 800. For example, pipeline 840 can be used to process and compress frames using a trained base model (e.g., base model 844) and a trained flow model (e.g., flow model 846).

In some examples, pipeline 840 can be used to encode additional frames from a group of frames by determining quantized updates to the parameters of the composite model. For example, pipeline 840 can be used to sequentially iterate over subsequent P-frames (e.g., P1 frame 842) to learn base model weight updates $\delta\theta$ and flow model weight updates $\delta\emptyset$ relative to a previous frame. In some cases, updates to the base model weights $\theta$ and updates to the flow model weights $\emptyset$ can be determined as follows:

$$\theta_t = \theta_{t-1} + \delta_t\theta \text{ and } \emptyset_t = \emptyset_{t-1} + \delta_t\theta \tag{8}$$

In some aspects, updated weights for the base model 844 and the flow model 846 can be sent to a receiver. In some cases, the weight updates $\delta\theta$ and $\delta\emptyset$ can be quantized on a fixed grid of n equal-sized bins of width t centered around $\delta\theta=0$. In some examples, the weight updates can be entropy-coded under a spike-and-slab prior, a mixture model of a narrow, and a wide Gaussian distribution given by:

$$p(\delta\theta) = \frac{\mathcal{N}\left(\delta\theta \big| 0, \sigma^2_{slab}\mathbb{1}\right) + \alpha \mathcal{N}\left(\delta\theta \big| 0, \sigma^2_{spike}\mathbb{1}\right)}{1+\alpha}. \tag{9}$$

In some aspects, the "slab" component with variance $\sigma_{slab}^2$ used in Equation (9) can minimize the bitrate for sending updated weights to a receiver. In some cases, the "spike" component with the narrow standard deviation $\sigma_{spike} \ll \sigma_{slab}$ can minimize the processing cost associated with zero-updates. In some examples, similar subsequent frames can have updates $\delta\theta$ that are sparse and associated with a relatively low bitrate cost. In some aspects, the quantization grid parameters n and t, the prior standard deviations $\sigma_{spike}$ and $\sigma_{slab}$, and the spike-slab ratio $\partial$ correspond to hyperparameters. As shown in FIG. 8B, the receiver outputs a reconstructed P1 frame 850 (shown as frame $\hat{P}_1$ 850) and reconstructed I frame (shown as frame $\hat{I}$ 848).

Figure 8C:
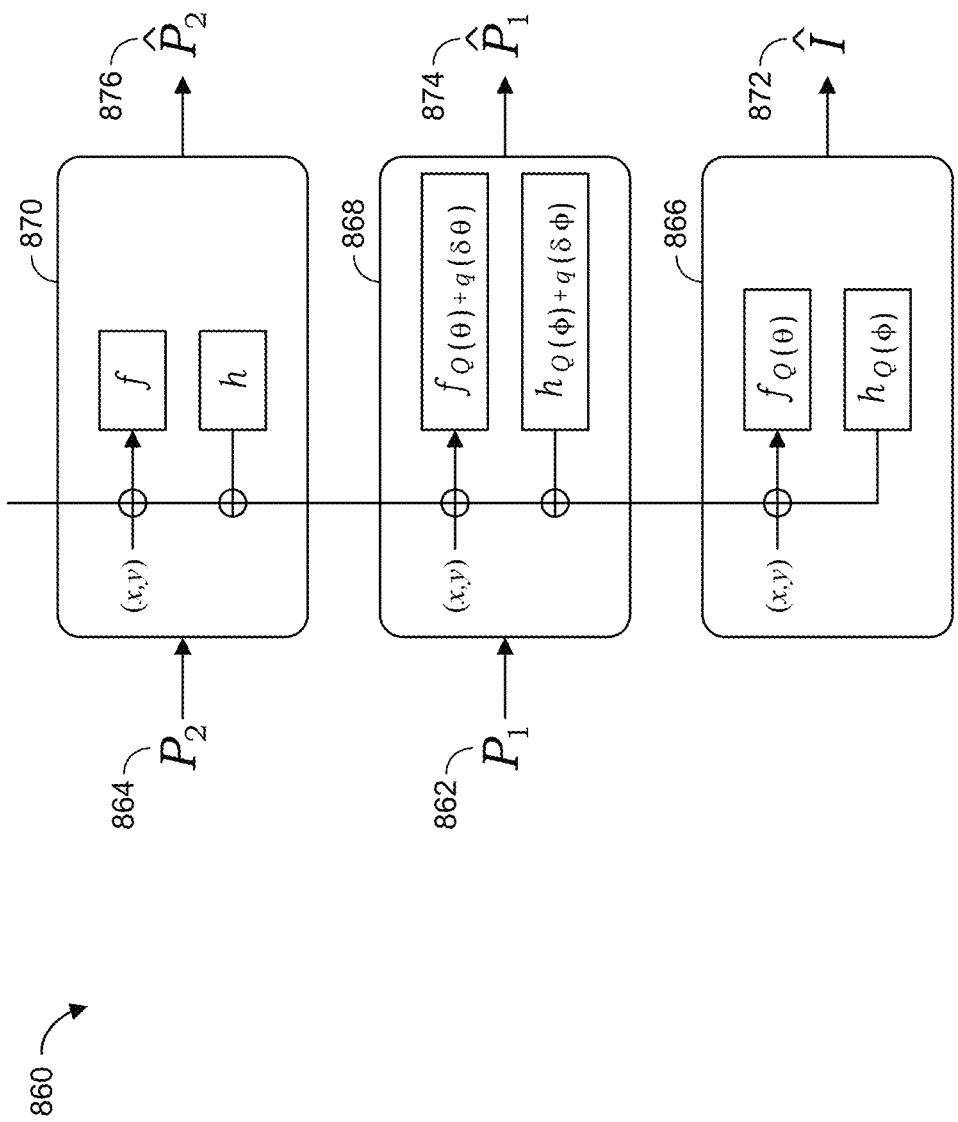
FIG. 8C is a diagram illustrating another example of a compression pipeline for a group of pictures using implicit neural representations, in accordance with some examples of the present disclosure.

FIG. 8C is a diagram illustrating an example of a pipeline 860 for a group of pictures using implicit neural representations. In some examples, pipeline 860 can include multiple stages that are configured to process a respective frame from a group of frames. For example, pipeline 860 can include a first stage 866 that can process a first frame (e.g., I-frame 802) to yield a reconstructed first frame $\hat{I}$ 872.

In some aspects, pipeline 860 can include a second stage 868 that can process a second frame (e.g., $P_1$ frame 862) to yield a reconstructed second frame $\hat{P}_1$ 874. In some examples, pipeline 860 can include a third stage 870 that can process a third frame (e.g., $P_2$ frame 864) to yield a reconstructed third frame $\hat{P}_2$ 876. Those skilled in the art will recognize that pipeline 860 can be configured to have any number of stages in accordance with the present technology.

In some examples, each stage of pipeline 860 can include a base model (e.g., base model 804) and a flow model (e.g., flow model 810). In some aspects, the input to the base model can be the elementwise sum of the input coordinates with the current flow model as well as the previous versions of the flow model outputs. In some cases, the appended flow models can be implemented as additional layers that can be added with a skip connection.

Figure 10:
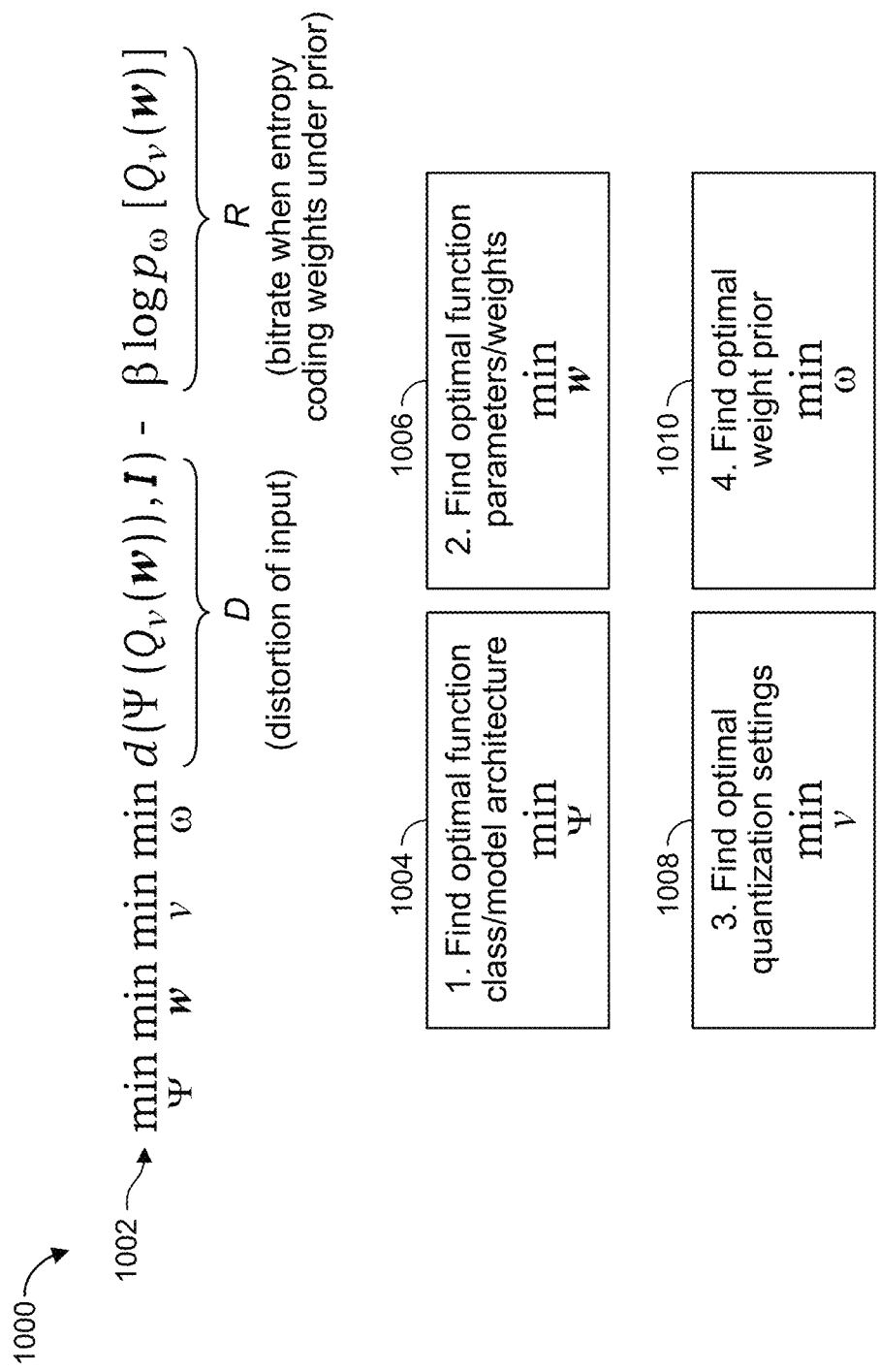
FIG. 10 is a diagram illustrating an example process for performing implicit neural compression, in accordance with some examples of the present disclosure.

FIG. 10 is a diagram illustrating an example process 1000 for performing implicit neural compression. In one aspect, each block of process 1000 can be associated with equation 1002, which can be implemented for minimizing rate distortion in a neural network compression system (e.g., system 700). In some examples, equation 1002 can have the following form:

$$\min_{\Psi} \min_{w} \min_{v} \min_{\omega} d(\Psi(Q_v(w)), I) - \beta \log p_\omega[Q_v(w)] \qquad (10)$$

Referring to equation 1002, d can correspond to a distortion function (e.g., MSE, MS-SSIM); $\Psi$ can correspond to an implicit model class (e.g., network type and architecture); $Q_v$ can correspond to a weight quantizer; w can correspond to implicit model weights; I can correspond to an input image or video; $\beta$ can correspond to a trade-off parameter; and $p_\omega$ can correspond to a weight prior.

Turning to process 1000, at block 1004 the process includes finding an optimal function class or model architecture. In some aspects, finding an optimal implicit model can include search over network architectures and training the weights for each model by minimizing the distortion loss (e.g., without quantization of weights). In some examples, the optimal model is selected based on minimized distortion loss. In some cases, a search can include a neural network search or Bayesian optimization technique.

At block 1006, the process 1000 includes finding optimal function parameters and/or weights. In some examples, finding optimal weights can include using gradient descent or stochastic gradient descent to find the optimal weights.

At block 1008, the process 1000 includes finding optimal quantization settings. In some aspects, finding optimal quantization settings can be performed using a trainable quantizer (e.g., trained using a machine learning algorithm). In some examples, quantization settings can be determined using codebook quantization, learned fixed-point quantization, and/or any other suitable quantization technique.

At block 1010, the process 1000 includes finding the optimal weight prior. In some cases, the optimal weight prior can be found by searching different distribution types (e.g., Gaussian, beta, Laplace, etc.). In some aspects, finding optimal weight prior can include fitting the parameters of the weight distribution (e.g., mean and/or standard deviation) to minimize rate loss. In some examples, a binary mask can be included for transmission to the decoder which can provide indication of binaries with no weights.

In some examples, steps in process 1000 can be executed in sequence or using parallel processing, where applicable. In some aspects, one or more parameters can allow for back-propagation, which can facilitate combination of one or more steps (e.g., block 1006 and block 1008 can be minimized using gradient descent when using a learnable quantizer).

Figure 11:
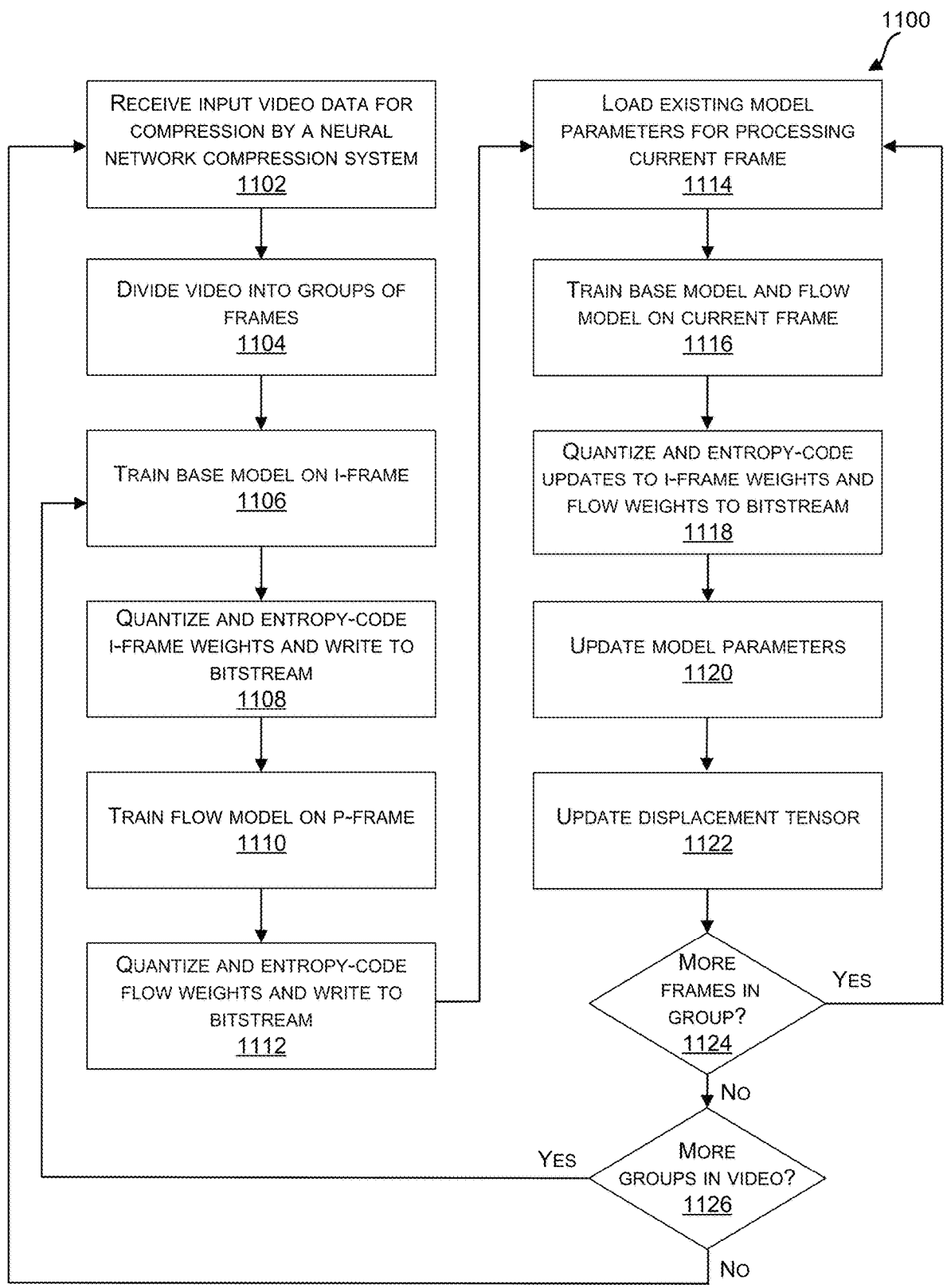
FIG. 11 is a flowchart illustrating an example of a process for compressing image data based on implicit neural representations, in accordance with some examples of the present disclosure.

FIG. 11 is a diagram illustrating an example process 1100 for performing implicit neural compression. At block 1102, the process 1100 can include receiving input video data for compression by a neural network compression system. In some examples, a neural network compression system can be configured to perform video and image compression using an implicit frame flow (IFF) that is based on implicit neural representations. For example, full-resolution video sequences can be compressed by representing each frame with a neural network that maps coordinate positions to pixel values. In some aspects, a separate implicit network can be used to modulate coordinate inputs in order to enable motion compensation (e.g., optical flow warping) between frames. In some examples, IFF can be implemented such that a receiver is not required to have access to a pre-trained neural network. In some cases, IFF can be implemented without need of a separate training dataset (e.g., the network can be trained using the input frames).

At block 1104, the process 1100 includes dividing the input video into groups of frames (also referred to as "groups of pictures" or "GoP"). In some examples, a group of frames can include 5 or more frames. In some aspects, the first frame in a group of frames can be compressed as a stand-alone image (e.g., an I-frame) while other frames in the group of frames can be compressed using available information from other frames. For instance, other frames in the group of frames can be compressed as P-frames that depend on the previous frame. In some aspects, frames can be compresses as B-frames that depend on both the preceding and the following frames.

At block 1106, the process 1100 includes training a base model (e.g., base model $f_{\theta_0}$) on an I-frame. In some examples, training the base mode on the I-frame can include minimizing distortion. In some aspects, training the base model on the I-frame can be based on the following relation:

$$\mathcal{L}_{IFF}(\theta, \tau, \omega) = \underbrace{\mathbb{E}_{t,x,y} \| f_{Q\tau(\theta t)}(x, y) - I_{t,x,y} \|_2^2}_{D} + \underbrace{\beta p_\omega Q_\tau(\theta_t))}_{R}. \qquad (11)$$

In Equation (11), t can correspond to the frame index; x, y can correspond to the coordinates within a video frame; $I_{t,x,y}$ can correspond to the ground-truth RGB values at the coordinates (x, y); $f_{\theta_t}$ (x, y) can correspond to the implicit neural network with weights $\theta_t$ evaluated at coordinates (x, y); $Q_\tau$ can correspond to the quantization function with parameters $\psi$; and $p_\omega$ can correspond to the prior that is used to compress the quantized weights $\omega$.

At block 1108, the process 1100 includes quantizing and entropy coding the I-frame weights $\theta_0$ and writing them to the bitstream. In some aspects, to reduce the model size of the implicit model representing I-frames, each weight tensor $\theta^{(l)} \in \theta$ can be quantized using a fixed-point representation (e.g., using Equation (2)). In some examples, the bit-width can be implicitly defined as $b(s, \theta_{max}) = (\theta_{max}+1)$, where s can correspond to the scale and $\theta_{max}$ can correspond to the clipping threshold. In some examples, per-channel quantization can be performed in order to obtain a separate range and bit-width for every row in the matrix. In one aspect, a per-channel mixed precision quantization function can be defined according to the following:

$$Q_t(\theta_{ij}) = \begin{cases} s_i \cdot \left\lfloor \dfrac{\theta_{ij}}{s_i} \right\rceil & |\theta_{ij}| \le \theta_{max,i}, \\ \mathrm{sign}(\theta_{ij} \cdot \theta_{max,i}) & |\theta_{ij}| > \theta_{max,i}, \end{cases} \qquad (12)$$

In some aspects, the quantization parameters $\tau = \{s^{(i)}, b^{(i)}\}_{i=1}^L$ and integer tensors $\theta_{int} = \{\theta_{int}^{(i)}\}_{i=1}^L$ can be encoded to the bitstream. For instance, the $s^{(i)}$ can be encoded as 32 bit floating point vectors, the bit-widths $b^{(i)}$ can be encoded as 5-bit integer vectors, and the integer tensors $\theta_{int}^{(i)}$ can be encoded in their respective per-channel bit width $b_i^{(i)}$.

At block 1110, the process 1100 includes training a flow model (e.g., model $h_{\phi_0}$) on a P-frame. In some aspects, a P-frame can correspond to a next sequential frame (e.g., the first P-frame after the I-frame) in a group of frames. As noted above, optical flow can be modeled implicitly by leveraging the continuity among implicit representations. Using IFF, frames can be represented as a network that takes image coordinates as input and return pixel values as follows: (x, y)→$f_\theta$(x, y)=(r, g, b). In some aspects, displacement from an optical flow field $h_\emptyset$(x, y)=($\Delta$x, $\Delta$y) can be applied by adding a displacement vector to the input variables (e.g., Equation (7)). In some aspects, training a flow model on a P-frame can be based on the relation in Equation (11).

At block 1112, the process 1100 includes quantizing and entropy coding the P-frame weights $\phi_0$ and writing them to the bitstream. In some aspects, the P-frame weights $\phi_0$ can be quantized and entropy coded using the methods described above with respect to the I-frame weights $\theta_0$. For example, the P-frame weights $\phi_0$ can be quantized using a fixed-point representation. In some instance, per-channel quantization can be performed in accordance with Equation (12). In some aspects, quantization parameters and integer tensors can be written to or encoded to the bitstream and sent to a receiver. In some aspects, learnable quantization parameters co can also be encoded and written to the bitstream.

At block 1114, the process 1100 includes loading the existing model parameters for processing current frame $P_t$. In some aspects, the current frame $P_t$ can correspond to a next frame in a group of frames. For example, the current frame can correspond to the frame that follows the I-frame and the P-frame that were used to train the base model and the flow model, respectively. In some aspects, the existing model parameters can be represented as the base model weights for the prior frame (e.g., $\theta_{t-1}$) and the flow model weights for the prior frame (e.g., $\theta_{t-1}$).

At block 1116, the process 1100 includes training the base model and the flow model on the current frame. In some aspects, training the base model and the flow model on the current frame includes learning weight updates $\delta\theta$ and $\delta\phi$ relative to the previous frame, such that:

$$\theta_t = \theta_{t-1} + \delta_t\theta \text{ and } \emptyset_t = \emptyset_{t-1} + \delta_t\theta. \tag{13}$$

In some examples, updates to the base model can correspond to modeling the residuals. In some cases, modeling the updates can avoid resending flow information that was previously computed (e.g., optical flow between consecutive frames is likely similar). In some aspects, the implicit representation of the P-frame T can be shown by the following equations:

$$P_T(x,y) = f_{\theta \Sigma_i T \delta_i}{}^\circ h_{\emptyset + \Sigma_i T \delta_i \emptyset}{}^\circ \ldots {}^\circ h_{\emptyset + \delta_1}{}^\circ h_{\emptyset(x,y)} \tag{14}$$

$$= f_\theta + \Sigma_i T \delta_i \theta(x + \Sigma \Delta_x y + \Sigma \Delta_y) \tag{15}$$

In some examples, as demonstrated by Equation (15), the cumulative effect of all prior flow models is stored in a single tensor that is the sum of the local displacements. In some cases, this tensor can be maintained by the sender and the receiver. In some aspects, use of the single tensor can avoid the need to store previous versions of flow networks in order to perform a forward pass through every network for each frame.

In some cases, training for the frame $P_T$ can be represented according to the following relation:

$$\min_{\delta\theta,\delta\phi} D_T[f_{\theta t-1} + \delta\theta^p h_{\phi t-1} + \delta\theta(x + \Delta_{t-1}y + \Delta_{t-1})] + \beta R(\delta\theta, \delta\phi). \tag{16}$$

In Equation (16), $D_T$ can denote distortion with respect to the frame $P_T$ and $R(\delta\theta,\delta\phi)$ can denote the updated rate cost.

At block 1118, the process 1100 can include quantizing and entropy-coding the weight updates $\delta\theta$ and $\delta\phi$ to the bitstream. In some examples, the updates $\delta\theta$ and $\delta\phi$ can be quantized on a fixed grid of n equal-sized bins of width t centered around $\delta\theta$=0. In some aspects, the quantized weight updates can be entropy-coded under a spike and slap prior as discussed with respect to Equation (9). As noted above, n some aspects the "slab" component with variance $\sigma_{slab}^2$ used in Equation (9) can minimize the bitrate for sending updated weights to a receiver. In some cases, the "spike" component with the narrow standard deviation $\sigma_{spike} << \sigma_{slab}$ can minimize the processing cost associated with zero-updates.

At block 1120, the process 1100 includes updating model parameters for the base model and the flow model. In some aspects, updates to the model parameters can be denoted as $\theta_t \leftarrow \theta_{t-1} + \delta\theta$ and $\emptyset_t \leftarrow \emptyset_{t-1} + \delta\theta$. In some cases, updates to the model parameters can be sent to a receiver.

At block 1122, the process 1100 includes updating the displacement tensor. In some aspects, updates to the displacement tensor can be denotes as $\theta_t \leftarrow \Delta_{t-1} + h_{\emptyset t}$.

At block 1124, the process 1100 can determine whether there are additional frames in the group of frames (e.g., GoP). If there are additional frames to process (e.g., additional P-frames), the process 1100 can repeat the operations discussed with respect to blocks 1114 to 1122. If the network compression system has completed processing the group of frames, the process 1100 can proceed to block 1126 and determine whether there are more groups of frames associated with the video input. If there are additional groups of frames to process, the method can return to block 1106 and begin training of the base model using a new I-frame corresponding to the next group of frames. If there are no additional groups of frames, the process 1100 can return to block 1102 to receive new input data for compression.

Figure 12:
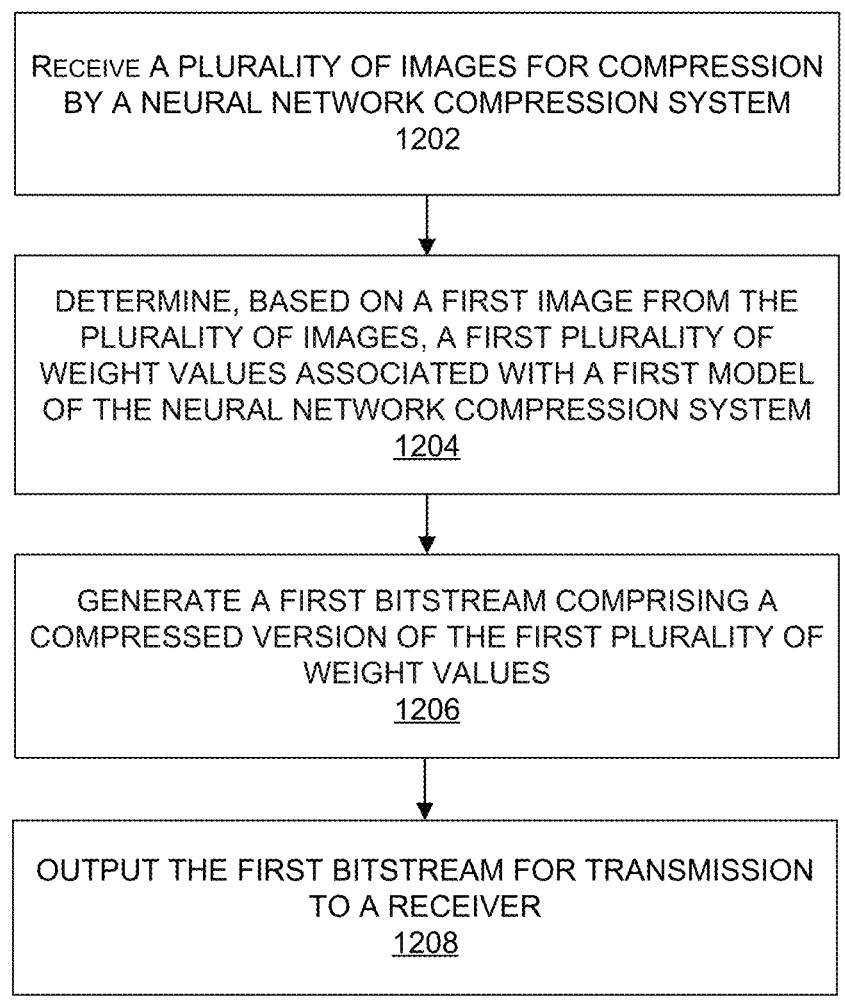
FIG. 12 is a flowchart illustrating another example of a process for compressing image data based on implicit neural representations, in accordance with some examples of the present disclosure.

FIG. 12 is a flowchart illustrating an example process 1200 for processing media data. At block 1202, the process 1200 can include receiving a plurality of images for compression by a neural network compression system. For example, implicit neural network compression system 700 can receive image data 702. In some aspects, implicit neural network compression system 700 can be implemented using pipeline 800 and the plurality of images can include I frame 802 and $P_1$ frame 808.

At block 1204, the process 1200 can include determining, based on a first image from the plurality of images, a first plurality of weight values associated with a first model of the neural network compression system. For instance, base model 804 can determine a first plurality of weight values (e.g., weights w 706) based on I frame 802. In some aspects, at least one layer of the first model can include a positional encoding of a plurality of coordinates associated with the first image. For instance, at least one layer of base model 804 can include a positional encoding of coordinates associated with I frame 802.

In some cases, the first model can be configured to determine one or more pixel values corresponding to the plurality of coordinates associated with the first image. For example, base model 804 can be configured to determine one or more pixel values (e.g., RGB values) corresponding to the plurality of coordinates associated with I frame 802.

At block 1206, the process 1200 can include generating a first bitstream comprising a compressed version of the first plurality of weight values. For example, arithmetic encoder 710 can generate bitstream 724 that may include a compressed version of the plurality of weight values (e.g., weights w 706). At block 1208, the process 1200 can include outputting the first bitstream for transmission to a receiver. For instance, bitstream 724 can be outputted by arithmetic encoder 710 for transmission to a receiver (e.g., arithmetic decoder 730).

In some aspects, the process 1200 can include quantizing the first plurality of weight values under a weight prior to yield a plurality of quantized weight values. In some cases, the bitstream can include a compressed version of the plurality of quantized weight values. For example, weights w 706 can be quantized under weight prior 712 to yield quantized weights 708. In some examples, quantized weights 708 can be encoded by arithmetic encoder 710 into bitstream 724. In some aspects, the process 1200 can include entropy encoding the first plurality of weight values using the weight prior. For instance, arithmetic encoder 710 can encode the quantized weights 708 using entropy coding under the weight prior 712 in the bitstream 724.

In some cases, the weight prior can be selected to minimize a rate loss associated with sending the first bitstream to the receiver. For example, weight prior 712 can be selected or configured to minimize the rate loss associated with sending bitstream 724 to the receiver. In some examples, the first plurality of weight values can be quantized using fixed-point quantization. In some aspects, the fixed-point quantization can be implemented using a machine learning algorithm. For example, weights w 706 can be quantized using a fixed-point quantization which can represent a weight tensor with a fixed-point number that includes an integer tensor and a scaling factor. In some cases, implicit neural network compression system 700 can implement fixed-point quantization of the weights w 706 using a machine learning algorithm.

In some aspects, the process 1200 can include determining, based on a second image from the plurality of images, a second plurality of weight values for use by a second model associated with the neural network compression system. For instance, pipeline 800 can determine, based on $P_1$ frame 808, a second set of weight values for use by flow model 810. In some cases, the process 1200 can include generating a second bitstream comprising a compressed version of the second plurality of weight values and outputting the second bitstream for transmission to a receiver. For example, an arithmetic encoder (e.g., arithmetic encoder 710) can generate a bitstream that may include a compressed version of the weight tensors used by flow model 810.

In some examples, the second model can be configured to determine an optical flow between the first image and the second image. For example, flow model 810 (e.g., flow model $h_\Theta$) that can be used to determine the optical flow field between I frame 802 and P1 frame 808. In some aspects, the process 1200 can include determining, based on the optical flow, at least one updated weight value from the first plurality of weight values. For instance, flow model 810 can determine, based on the optical flow, an updated weight value from the weight values used by base model 804.

In some aspects, the process 1200 can include selecting, based on the first image, a model architecture corresponding to the first model. In some cases, selecting the model architecture can include tuning, based on the first image, a plurality of weight values associated with one or more model architectures, wherein each of the one or more model architectures is associated with one or more model characteristics. For example, implicit neural compression system 700 can tune weights w 706 for each model architecture based on image data 702. In some examples, the one or more model characteristics can include at least one of a width, a depth, a resolution, a size of a convolution kernel, and an input dimension.

In some cases, the process 1200 can include determining at least one distortion between the first image and reconstructed data output corresponding to each of the one or more model architectures. For example, implicit neural compression system 700 can tune the weights w 706 associated with each model to minimize the distortion loss without quantization. In some aspects, the process 1200 can include selecting the model architecture from the one or more model architectures based on the at least one distortion. For instance, implicit neural compression system 700 can select the model architecture based on the lowest distortion value.

In some examples, the process 1200 can include generating a second bitstream comprising a compressed version of the model architecture and outputting the second bitstream for transmission to the receiver. For example, architecture encoder 716 can encode model architecture $\Psi(\cdot)$ 718 in the bitstream 720 and output bitstream 720 for transmission to a receiver (e.g., architecture decoder 726).

FIG. 13 is a flowchart illustrating an example process 1300 for processing media data. At block 1302, the process 1300 can include receiving a compressed version of a first plurality of neural network weight values associated with a first image from a plurality of images. For example, arithmetic decoder 730 can receive bitstream 724 that can include a plurality of weight values (e.g., weights w 706) associated with image data 702.

At block 1304, the process 1300 can include decompressing the first plurality of neural network weight values. For instance, arithmetic decoder can decompress weights w 706 from bitstream 724. At block 1306, the process 1300 can include processing, using a first neural network model, the first plurality of neural network weight values to yield the first image. For example, implicit neural compression system 700 can include pipeline 800 having quantized base model 806 that can be used to process the weight tensors to yield a reconstructed version of I frame 802.

In some aspects, the process 1300 can include receiving a compressed version of a second plurality of neural network weight values associated with a second image from the plurality of images. In some cases, the process 1300 can include decompressing the second plurality of neural network weight values and processing, using a second neural network model, the second plurality of neural network weight values to determine an optical flow between the first image and the second image. For example, implicit neural compression system 600 can include pipeline 800 having quantized flow model that can be used to process the weight tensors associated with flow model 810 to determine an optical flow between I frame 802 and $P_1$ frame 808.

In some cases, the process 1300 can include determining, based on the optical flow, at least one updated weight value from the first plurality of neural network weight values associated with the first neural network model. For instance, flow model 810 can determine an updated weight value from the weights associated with flow model 810. In some aspects, the process 1300 can include processing, using the first neural network model, the at least one updated weight value to yield a reconstructed version of the second image. For example, quantized base model 806 can use the updated weights (e.g., based on optical flow) to yield a reconstructed version of $P_1$ frame 808.

In some examples, the first plurality of neural network weight values can be quantized under a weight prior. For example, the weights received by quantized base model 806 can be quantized under a weight prior (e.g., weight prior 712). In some aspects, the compressed version of the first plurality of network weight values is received in an entropy encoded bitstream. For instance, arithmetic encoder 710 can perform entropy encoding of the weights (e.g., weights w 706) or the quantized weights (e.g., quantized weights 708) and output bitstream 724.

In some cases, the process 1300 can include receiving a compressed version of a neural network architecture corresponding to the first neural network model. For instance, architecture encoder 716 can encode model architecture Ψ(Ψ) 718 in bitstream 720 and send it to architecture decoder 726.

FIG. 14 is a flowchart illustrating an example process 1400 for compressing image data based on implicit neural representations. At block 1402, the process 1400 can include receiving input data for compression by a neural network compression system. In some aspects, the input data can correspond to media data (e.g., video data, picture data, audio data, etc.). In some examples, the input data can include a plurality of coordinates corresponding to image data used for training the neural network compression system.

At block 1404, the process 1400 can include selecting, based on the input data, a model architecture for use by the neural network compression system for compressing the input data. In some aspects, selecting the model architecture can include tuning, based on the input data, a plurality of weight values associated with one or more model architectures, wherein each of the one or more model architectures is associated with one or more model characteristics. In some examples, selecting the model architecture can also include determining at least one distortion between the input data and reconstructed data output corresponding to each of the one or more model architectures. In some cases, selecting the model architecture from the one or more model architectures can be based on the at least one distortion. In some aspects, the one or more model characteristics can include at least one of a width, a depth, a resolution, a size of a convolution kernel, and an input dimension.

At block 1406, the process 1400 can include determining, using the input data, a plurality of weight values corresponding to a plurality of layers associated with the model architecture. At block 1408, the process 1400 can include generating a first bitstream comprising a compressed version of a weigh prior. In some examples, generating the first bitstream can include encoding the weight prior using an Open Neural Network Exchange (ONNX) format. At block 1410, the process 1400 can include generating a second bitstream comprising a compressed version of the plurality of weight values under the weight prior. In some aspects, generating the second bitstream can include entropy encoding the plurality of weight values using the weight prior. In some examples, the weight prior can be selected to minimize a rate loss associated with sending the second bitstream to the receiver.

At block 1412, the process 1400 can include outputting the first bitstream and the second bitstream for transmission to a receiver. In some examples, the process can include generating a third bitstream comprising a compressed version of the model architecture and outputting the third bitstream for transmission to the receiver. In some aspects, at least one layer of the model architecture comprises a positional encoding of a plurality of coordinates associated with the input data.

In some examples, the process can include quantizing the plurality of weight values to yield a plurality of quantized weight values, wherein the second bitstream comprises a compressed version of the plurality of quantized weight values under the weight prior. In some aspects, the plurality of weight values can be quantized using a learned fixed-point quantization. In some cases, the learned fixed-point quantization can be implemented using a machine learning algorithm. In some examples, the second bitstream can include a plurality of encoded quantization parameters used for quantizing the plurality of weight values.

Figure 15:
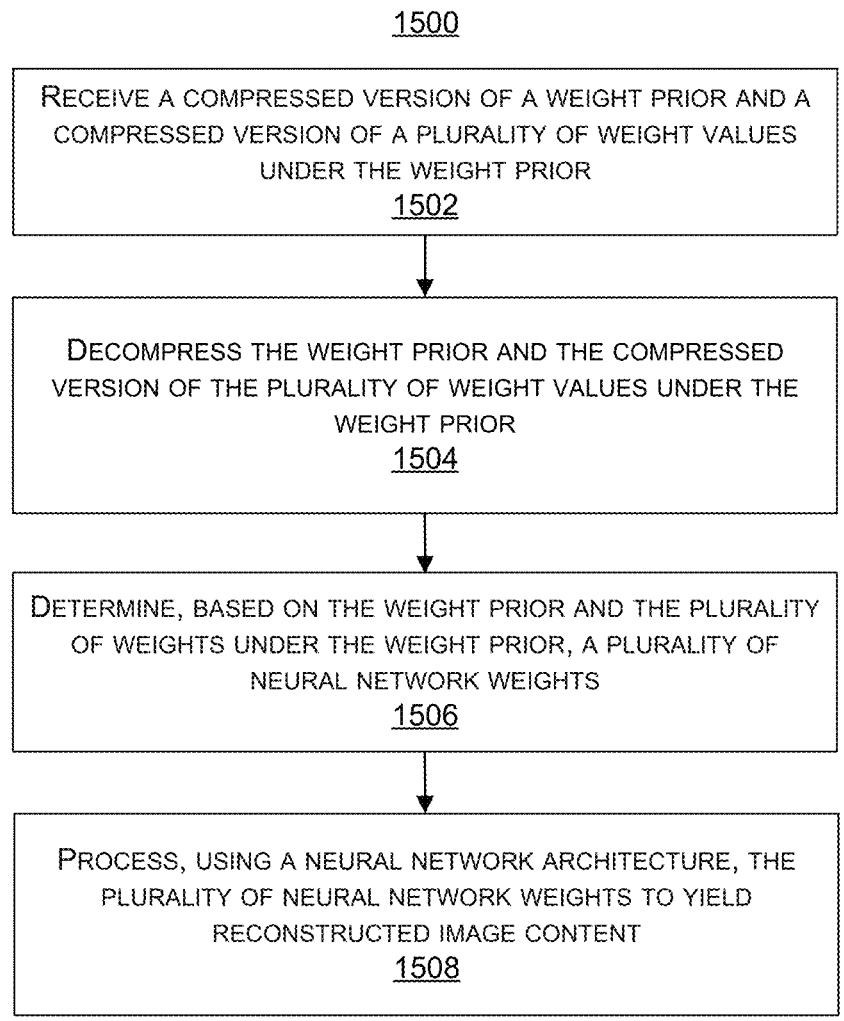
FIG. 15 is a flowchart illustrating an example of a process for decompressing image data based on implicit neural representations, in accordance with some examples of the present disclosure.

FIG. 15 is a flowchart illustrating an example of a process 1500 for decompressing image data based on implicit neural representations. At block 1502, the process 1500 can include receiving a compressed version of a weight prior and a compressed version of a plurality of weight values under the weight prior. In some aspects, the plurality of weights under the weight prior can be received in an entropy encoded bitstream. At block 1504, the process 1500 can include decompressing the weight prior and the compressed version of the plurality of weight values under the weight prior.

At block 1506, the process 1500 can include determining, based on the weight prior and the plurality of weights under the weight prior, a plurality of neural network weights. At block 1508, the process 1500 can include processing, using a neural network architecture, the plurality of neural network weights to yield reconstructed image content. In some aspects, the plurality of weight values under the weight prior can correspond to a plurality of quantized weights under the weight prior. In some examples, the process can include receiving a plurality of encoded quantization parameters used for quantizing the plurality of quantized weights under the weight prior.

In some aspects, the process can include receiving a compressed version of the neural network architecture and decompressing the compressed version of the neural network architecture. In some examples, the process can include redistributing the plurality of weights under the weight prior based on a binary mask.

In some examples, the processes described herein (e.g., process 1100, process 1200, process 1300, process 1400, process 1500, and/or other process described herein) may be performed by a computing device or apparatus. In one example, the process 1100, 1200, 1300, 1400, and/or 1500 can be performed by a computing device according to the system 400 shown in FIG. 4 or the computing system 1600 shown in FIG. 16.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100, the process 1200, the process 1300, the process 1400, the process 1500, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1100, 1200, 1300, 1400, and 1500 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100, 1200, 1300, 1400, 1500, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
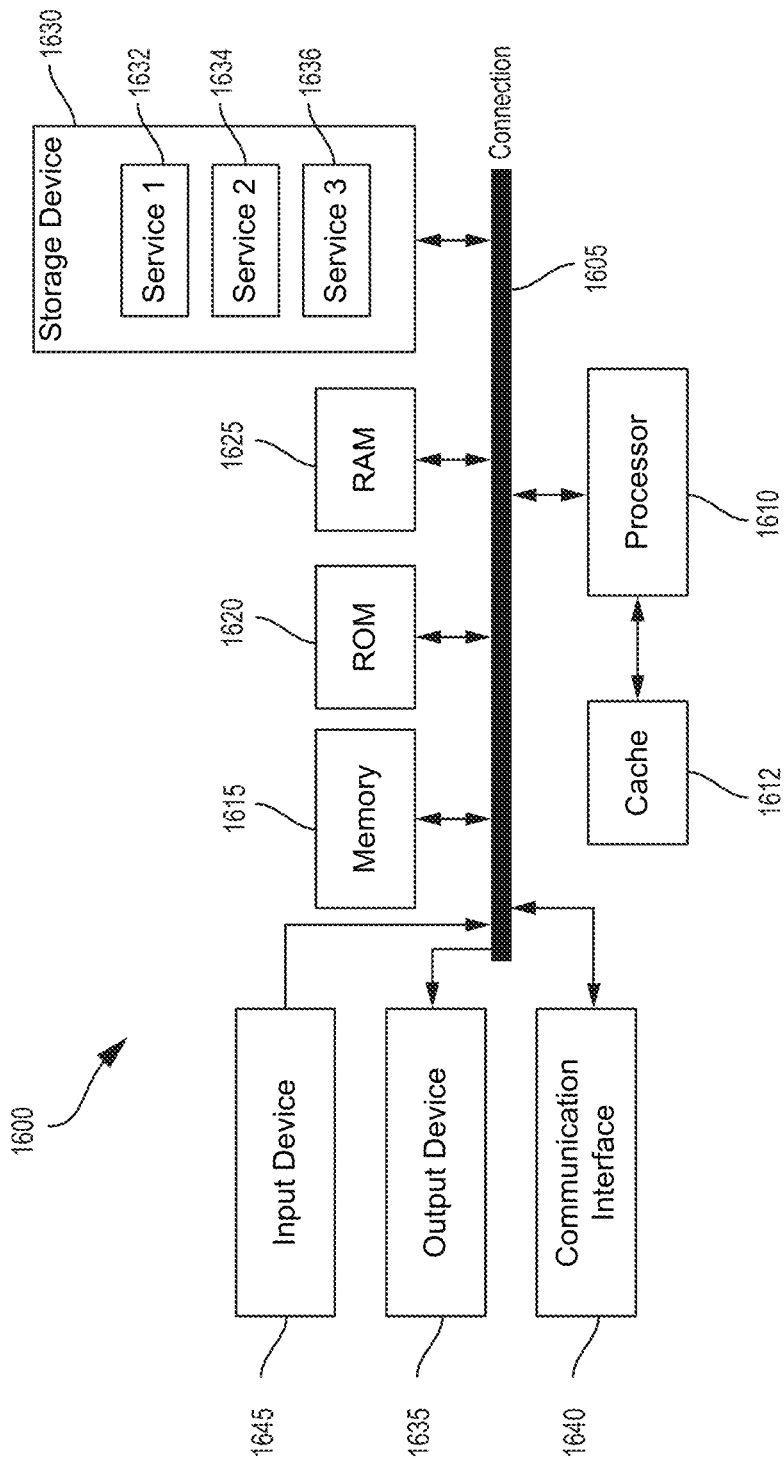
FIG. 16 illustrates an example computing system, in accordance with some examples of the present disclosure.

FIG. 16 is a diagram illustrating an example of a system for implementing certain aspects of the present technology. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600. Computing system 1600 can include communications interface 1640, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising: at least one memory; and at least one processor coupled to the at least one memory and configured to: receive a plurality of images for compression by a neural network compression system; determine, based on a first image from the plurality of images, a first plurality of weight values associated with a first model of the neural network compression system; generate a first bitstream comprising a compressed version of the first plurality of weight values; and output the first bitstream for transmission to a receiver.

Aspect 2: The apparatus of Aspect 1, wherein at least one layer of the first model includes a positional encoding of a plurality of coordinates associated with the first image.

Aspect 3: The apparatus of Aspect 2, wherein the first model is configured to determine one or more pixel values corresponding to the plurality of coordinates associated with the first image.

Aspect 4: The apparatus of any of Aspects 1 to 3, wherein the at least one processor is further configured to: determine, based on a second image from the plurality of images, a second plurality of weight values for use by a second model associated with the neural network compression system; generate a second bitstream comprising a compressed version of the second plurality of weight values; and output the second bitstream for transmission to a receiver.

Aspect 5: The apparatus of Aspect 4, wherein the second model is configured to determine an optical flow between the first image and the second image.

Aspect 6: The apparatus of Aspect 5, wherein the at least one processor is further configured to: determine, based on the optical flow, at least one updated weight value from the first plurality of weight values.

Aspect 7: The apparatus of any of Aspects 1 to 6, wherein the at least one processor is further configured to: quantize the first plurality of weight values under a weight prior to yield a plurality of quantized weight values, wherein the first bitstream comprises a compressed version of the plurality of quantized weight values.

Aspect 8: The apparatus of Aspect 7, wherein the weight prior is selected to minimize a rate loss associated with sending the first bitstream to the receiver.

Aspect 9: The apparatus of any of Aspects 7 to 8, wherein to generate the first bitstream the at least one processor is further configured to: entropy encode the first plurality of weight values using the weight prior.

Aspect 10: The apparatus of any of Aspects 7 to 9, wherein the first plurality of weight values is quantized using fixed-point quantization.

Aspect 11: The apparatus of Aspect 10, wherein the fixed-point quantization is implemented using a machine learning algorithm.

Aspect 12: The apparatus of any of Aspects 1 to 11, wherein the at least one processor is further configured to: select, based on the first image, a model architecture corresponding to the first model.

Aspect 13: The apparatus of Aspect 12, wherein the at least one processor is further configured to: generate a second bitstream comprising a compressed version of the model architecture; and output the second bitstream for transmission to the receiver.

Aspect 14: The apparatus of any of Aspects 12 to 13, wherein to select the model architecture the at least one processor is further configured to: tune, based on the first image, a plurality of weight values associated with one or more model architectures, wherein each of the one or more model architectures is associated with one or more model characteristics; determine at least one distortion between the first image and reconstructed data output corresponding to each of the one or more model architectures; and select the model architecture from the one or more model architectures based on the at least one distortion.

Aspect 15: The apparatus of Aspect 14, wherein the one or more model characteristics include at least one of a width, a depth, a resolution, a size of a convolution kernel, and an input dimension.

Aspect 16: A method of performing any of the operations of Aspects 1 to 15.

Aspect 17: A computer-readable storage medium storing instructions that, when executed, cause one or more processors to perform any of the operations of aspects 1 to 15.

Aspect 18: An apparatus comprising means for performing any of the operations of aspects 1 to 15.

Aspect 19: An apparatus comprising: at least one memory; and at least one processor coupled to the at least one memory and configured to: receive a compressed version of a first plurality of neural network weight values associated with a first image from a plurality of images; decompress the first plurality of neural network weight values; and process, using a first neural network model, the first plurality of neural network weight values to yield the first image.

Aspect 20: The apparatus of Aspect 19, wherein the at least one processor is further configured to: receive a compressed version of a second plurality of neural network weight values associated with a second image from the plurality of images; decompress the second plurality of neural network weight values; and process, using a second neural network model, the second plurality of neural network weight values to determine an optical flow between the first image and the second image.

Aspect 21: The apparatus of Aspect 20, wherein the at least one processor is further configured to: determine, based on the optical flow, at least one updated weight value from the first plurality of neural network weight values associated with the first neural network model.

Aspect 22: The apparatus of Aspect 21, wherein the at least one processor is further configured to: process, using the first neural network model, the at least one updated weight value to yield a reconstructed version of the second image.

Aspect 23: The apparatus of any of Aspects 19 to 22, wherein the first plurality of neural network weight values is quantized under a weight prior.

Aspect 24: The apparatus of any of Aspects 19 to 23, wherein the compressed version of the first plurality of neural network weight values is received in an entropy encoded bitstream.

Aspect 25: The apparatus of any of Aspects 19 to 24, wherein the at least one processor is further configured to: receive a compressed version of a neural network architecture corresponding to the first neural network model.

Aspect 26: A method of performing any of the operations of Aspects 19 to 25.

Aspect 27: A computer-readable storage medium storing instructions that, when executed, cause one or more processors to perform any of the operations of aspects 19 to 25.

Aspect 28: An apparatus comprising means for performing any of the operations of aspects 19 to 25.

Aspect 29: An apparatus comprising memory; and one or more processors coupled to the memory, the one or more processors being configured to: receive input data for compression by a neural network compression system; select, based on the input data, a model architecture for use by the neural network compression system for compressing the input data; determine, using the input data, a plurality of weight values corresponding to a plurality of layers associated with the model architecture; generate a first bitstream comprising a compressed version of a weight prior; generate a second bitstream comprising a compressed version of the plurality of weight values under the weight prior; and output the first bitstream and the second bitstream for transmission to a receiver.

Aspect 30: The apparatus of Aspect 29, wherein to select the model architecture for use by the neural network the one or more processors are configured to: tune, based on the input data, a plurality of weight values associated with one or more model architectures, wherein each of the one or more model architectures is associated with one or more model characteristics; determine at least one distortion between the input data and reconstructed data output corresponding to each of the one or more model architectures; and select the model architecture from the one or more model architectures based on the at least one distortion.

Aspect 31: The apparatus of Aspect 30, wherein the one or more model characteristics include at least one of a width, a depth, a resolution, a size of a convolution kernel, and an input dimension.

Aspect 32: The apparatus of any of Aspects 29 to 31, wherein the one or more processors are further configured to: quantize the plurality of weight values to yield a plurality of quantized weight values, wherein the second bitstream comprises a compressed version of the plurality of quantized weight values under the weight prior.

Aspect 33: The apparatus of Aspect 32, wherein the plurality of weight values are quantized using learned fixed-point quantization.

Aspect 34: The apparatus of Aspect 32, wherein the fixed-point quantization is implemented using a machine learning algorithm.

Aspect 35: The apparatus of Aspect 32, wherein the second bitstream comprises a plurality of encoded quantization parameters used for quantizing the plurality of weight values.

Aspect 36: The apparatus of any of Aspects 29 to 35, wherein the one or more processors are further configured to: generate a third bitstream comprising a compressed version of the model architecture; and output the third bitstream for transmission to the receiver.

Aspect 37: The apparatus of any of Aspects 29 to 36 wherein at least one layer of the model architecture comprises a positional encoding of a plurality of coordinates associated with the input data.

Aspect 38: The apparatus of any of Aspects 29 to 37, wherein to generate the first bitstream the one or more processors are configured to: encode the weight prior using an Open Neural Network Exchange format.

Aspect 39: The apparatus of any of Aspects 29 to 38, wherein to generate the second bitstream the one or more processors are configured to: entropy encode the plurality of weight values using the weight prior.

Aspect 40: The apparatus of any of Aspects 29 to 39, wherein the weight prior is selected to minimize a rate loss associated with sending the second bitstream to the receiver.

Aspect 41: The apparatus of any of Aspects 29 to 40, wherein the input data includes a plurality of coordinates corresponding to image data used for training the neural network compression system.

Aspect 42: A method of performing any of the operations of Aspects 29 to 41.

Aspect 43: A computer-readable storage medium storing instructions that, when executed, cause one or more processors to perform any of the operations of aspects 29 to 41.

Aspect 44: An apparatus comprising means for performing any of the operations of aspects 29 to 41.

Aspect 45: An apparatus comprising memory; and one or more processors coupled to the memory, the one or more processors being configured to: receive a compressed version of a weight prior and a compressed version of a plurality of weight values under the weight prior; decompress the weight prior and the compressed version of the plurality of weight values under the weight prior; determine, based on the weight prior and the plurality of weights under the weight prior, a plurality of neural network weights; and processing, using a neural network architecture, the plurality of neural network weights to yield reconstructed image content.

Aspect 46: The apparatus of Aspect 45, wherein the one or more processors are further configured to: receive a compressed version of the neural network architecture; and decompress the compressed version of the neural network architecture.

Aspect 47: The apparatus of any of Aspects 45 to 46, wherein the plurality of weight values under the weight prior corresponds to a plurality of quantized weights under the weight prior.

Aspect 48: The apparatus of Aspect 47, wherein the one or more processors are further configured to: receive a plurality of encoded quantization parameters used for quantizing the plurality of quantized weights under the weight prior.

Aspect 49: The apparatus of any of Aspects 45 to 48, wherein the compressed version of the plurality of weights under the weight prior is received in an entropy encoded bitstream.

Aspect 50: The apparatus of any of Aspects 45 to 49, wherein the one or more processors are further configured to: redistribute the plurality of weights under the weight prior based on a binary mask.

Aspect 51: A method of performing any of the operations of Aspects 45 to 50.

Aspect 52: A computer-readable storage medium storing instructions that, when executed, cause one or more processors to perform any of the operations of aspects 45 to 50.

Aspect 53: An apparatus comprising means for performing any of the operations of aspects 45 to 50.

What is claimed is:

1. A method of processing media data, comprising:
receiving a plurality of images for compression by a neural network compression system;
processing, using initialized weight values for weights of a first model of the neural network compression system, a coordinate grid to generate reconstructed output values for a first image from the plurality of images, wherein the coordinate grid is separate from the first image;
comparing values of the first image to the reconstructed output values for the first image to determine a loss for the reconstructed output values;
tuning, using backpropagation to reduce the determined loss, the weights of the first model to generate a first plurality of tuned weight values for the weights of the first model for reconstructing the first image;
generating a first bitstream comprising a compressed version of the first plurality of tuned weight values; and
outputting the first bitstream for transmission to a receiver for reconstructing the first image.

2. The method of claim 1, wherein at least one layer of the first model includes a positional encoding of a plurality of coordinates associated with the first image.

3. The method of claim 2, wherein the reconstructed output values include one or more pixel values corresponding to the plurality of coordinates associated with the first image.

4. The method of claim 1, further comprising:
determining, based on a second image from the plurality of images, a second plurality of tuned weight values for weights of a second model associated with the neural network compression system;
generating a second bitstream comprising a compressed version of the second plurality of tuned weight values; and
outputting the second bitstream for transmission to a receiver.

5. The method of claim 4, wherein the second model is configured to determine an optical flow between the first image and the second image.

6. The method of claim 5, further comprising:
determining, based on the optical flow, at least one updated weight value from the first plurality of tuned weight values.

7. The method of claim 1, further comprising:
quantizing the first plurality of tuned weight values under a weight prior to generate a plurality of quantized weight values, wherein the first bitstream comprises a compressed version of the plurality of quantized weight values.

8. The method of claim 7, wherein the weight prior is selected to minimize a rate loss associated with sending the first bitstream to the receiver.

9. The method of claim 7, wherein generating the first bitstream comprises:
entropy encoding the first plurality of tuned weight values using the weight prior.

10. The method of claim 7, wherein the first plurality of tuned weight values is quantized using fixed-point quantization.

11. The method of claim 10, wherein the fixed-point quantization is implemented using a machine learning algorithm.

12. The method of claim 1, further comprising:
selecting, based on the first image, a model architecture corresponding to the first model.

13. The method of claim 12, further comprising:
generating a second bitstream comprising a compressed version of the model architecture; and
outputting the second bitstream for transmission to the receiver.

14. The method of claim 12, wherein selecting the model architecture comprises:
determining, based on the first image, a respective plurality of tuned weight values associated with each model architecture of a plurality of model architectures, wherein each model architecture of the plurality of model architectures is associated with respective one or more model characteristics;
determining at least one distortion between the first image and respective reconstructed output values corresponding to each model architecture of the plurality of model architectures; and
selecting the model architecture from the plurality of model architectures based on the at least one distortion.

15. The method of claim 14, wherein the respective one or more model characteristics include at least one of a width, a depth, a resolution, a size of a convolution kernel, and an input dimension.

16. An apparatus comprising:
at least one memory; and
at least one processor coupled to the at least one memory and configured to:
receive a plurality of images for compression by a neural network compression system;
process, using initialized weight values for weights of a first model of the neural network compression system, a coordinate grid to generate reconstructed output values for a first image from the plurality of images, wherein the coordinate grid is separate from the first image;
compare values of the first image to the reconstructed output values for the first image to determine a loss for the reconstructed output values;
tune, using backpropagation to reduce the determined loss, the weights of the first model to generate a first plurality of tuned weight values for the weights of the first model for reconstructing the first image;
generate a first bitstream comprising a compressed version of the first plurality of tuned weight values; and
output the first bitstream for transmission to a receiver for reconstructing the first image.

17. The apparatus of claim 16, wherein at least one layer of the first model includes a positional encoding of a plurality of coordinates associated with the first image.

18. The apparatus of claim 17, wherein the reconstructed output values include one or more pixel values corresponding to the plurality of coordinates associated with the first image.

19. The apparatus of claim 16, wherein the at least one processor is further configured to:
determine, based on a second image from the plurality of images, a second plurality of tuned weight values for weights of a second model associated with the neural network compression system;
generate a second bitstream comprising a compressed version of the second plurality of tuned weight values; and
output the second bitstream for transmission to a receiver.

20. The apparatus of claim 19, wherein the second model is configured to determine an optical flow between the first image and the second image.

21. The apparatus of claim 20, wherein the at least one processor is further configured to:
determine, based on the optical flow, at least one updated weight value from the first plurality of tuned weight values.

22. The apparatus of claim 16, wherein the at least one processor is further configured to:
quantize the first plurality of tuned weight values under a weight prior to generate a plurality of quantized weight values, wherein the first bitstream comprises a compressed version of the plurality of quantized weight values.

23. The apparatus of claim 22, wherein the weight prior is selected to minimize a rate loss associated with sending the first bitstream to the receiver.

24. The apparatus of claim 22, wherein to generate the first bitstream the at least one processor is further configured to:
entropy encode the first plurality of tuned weight values using the weight prior.

25. The apparatus of claim 22, wherein the first plurality of tuned weight values are quantized using fixed-point quantization.

26. The apparatus of claim 25, wherein the fixed-point quantization is implemented using a machine learning algorithm.

27. The apparatus of claim 16, wherein the at least one processor is further configured to:
select, based on the first image, a model architecture corresponding to the first model.

28. The apparatus of claim 27, wherein the at least one processor is further configured to:
generate a second bitstream comprising a compressed version of the model architecture; and
output the second bitstream for transmission to the receiver.

29. The apparatus of claim 27, wherein to select the model architecture the at least one processor is further configured to:
- determine, based on the first image, a respective plurality of tuned weight values associated with each model architecture of a plurality of model architectures, wherein each model architecture of the plurality of model architectures is associated with respective one or more model characteristics;
- determine at least one distortion between the first image and respective reconstructed output values corresponding to each model architecture of the plurality of model architectures; and
- select the model architecture from the plurality of model architectures based on the at least one distortion.

30. The apparatus of claim 29, wherein the respective one or more model characteristics include at least one of a width, a depth, a resolution, a size of a convolution kernel, and an input dimension.

31. A method for processing media data, comprising:
- receiving a compressed version of a neural network architecture corresponding to a first neural network model;
- receiving a compressed version of a first plurality of neural network weight values associated with the first neural network model for reconstructing a first image from a plurality of images;
- decompressing the compressed version of the neural network architecture to generate a reconstructed version of the first neural network model;
- decompressing the compressed version of the first plurality of neural network weight values to generate a reconstructed version of the first plurality of neural network weight values; and
- processing, using the reconstructed version of the first neural network model, the reconstructed version of the first plurality of neural network weight values to generate a reconstructed version of the first image.

32. The method of claim 31, further comprising:
- receiving a compressed version of a second plurality of neural network weight values associated with a second image from the plurality of images;
- decompressing the compressed version of the second plurality of neural network weight values to generate a reconstructed version of the second plurality of neural network weight values; and
- processing, using a second neural network model, the reconstructed version of the second plurality of neural network weight values to determine an optical flow between the first image and the second image.

33. The method of claim 32, further comprising:
- determining, based on the optical flow, at least one updated weight value from the reconstructed version of the first plurality of neural network weight values associated with the reconstructed version of the first neural network model.

34. The method of claim 33, further comprising:
- processing, using the reconstructed version of the first neural network model, the at least one updated weight value to generate a reconstructed version of the second image.

35. The method of claim 31, wherein the first plurality of neural network weight values is quantized under a weight prior.

36. The method of claim 31, wherein the compressed version of the first plurality of neural network weight values is received in an entropy encoded bitstream.

37. The method of claim 31, wherein at least one layer of the first neural network model includes a positional encoding of a plurality of coordinates associated with the first image, and wherein the reconstructed version of the first image includes one or more pixel values corresponding to the plurality of coordinates associated with the first image.

38. An apparatus comprising:
- at least one memory; and
- at least one processor coupled to the at least one memory and configured to:
  - receive a compressed version of a neural network architecture corresponding to a first neural network model;
  - receive a compressed version of a first plurality of neural network weight values associated with the first neural network model for reconstructing a first image from a plurality of images;
  - decompress the compressed version of the first plurality of neural network weight values to generate a reconstructed version of the first plurality of neural network weight values; and
  - process, using the reconstructed version of the first neural network model, the reconstructed version of the first plurality of neural network weight values to generate a reconstructed version of the first image.

39. The apparatus of claim 38, wherein the at least one processor is further configured to:
- receive a compressed version of a second plurality of neural network weight values associated with a second image from the plurality of images;
- decompress the compressed version of the second plurality of neural network weight values to generate a reconstructed version of the second plurality of neural network weight values; and
- process, using a second neural network model, the reconstructed version of the second plurality of neural network weight values to determine an optical flow between the first image and the second image.

40. The apparatus of claim 39, wherein the at least one processor is further configured to:
- determine, based on the optical flow, at least one updated weight value from the reconstructed version of the first plurality of neural network weight values associated with the reconstructed version of the first neural network model.

41. The apparatus of claim 40, wherein the at least one processor is further configured to:
- process, using the reconstructed version of the first neural network model, the at least one updated weight value to generate a reconstructed version of the second image.

42. The apparatus of claim 38, wherein the first plurality of neural network weight values is quantized under a weight prior.

43. The apparatus of claim 38, wherein the compressed version of the first plurality of neural network weight values is received in an entropy encoded bitstream.

44. The apparatus of claim 38, wherein at least one layer of the first neural network model includes a positional encoding of a plurality of coordinates associated with the first image, and wherein the reconstructed version of the first image includes one or more pixel values corresponding to the plurality of coordinates associated with the first image.

* * * * *